(12) United States Patent
Minich

(10) Patent No.: US 8,930,092 B2
(45) Date of Patent: Jan. 6, 2015

(54) INTEGRATED PAVING PROCESS CONTROL FOR A PAVING OPERATION

(76) Inventor: Mark Minich, Cape Coral, FL (US)

( * ) Notice: Subject to any disclaimer, the term of this patent is extended or adjusted under 35 U.S.C. 154(b) by 352 days.

(21) Appl. No.: 13/438,023

(22) Filed: Apr. 3, 2012

(65) Prior Publication Data

US 2012/0288328 A1 Nov. 15, 2012

Related U.S. Application Data

(60) Provisional application No. 61/484,358, filed on May 10, 2011.

(51) Int. Cl.
*E01C 23/07* (2006.01)
*G06F 19/00* (2011.01)

(52) U.S. Cl.
USPC ................. 701/50; 701/2; 404/84.1

(58) Field of Classification Search
CPC ........... E01C 7/32; E01C 23/06; E01C 23/07; E01C 19/12; E01C 11/24; G06F 19/00
USPC ............ 701/2, 50; 404/72, 84.1, 85, 101, 103
See application file for complete search history.

(56) References Cited

U.S. PATENT DOCUMENTS

| | | | | |
|---|---|---|---|---|
| 4,012,160 | A * | 3/1977 | Parker | 404/84.05 |
| 4,780,022 | A | 10/1988 | Ohiba et al. | |
| 4,929,121 | A | 5/1990 | Lent et al. | |
| 5,044,819 | A | 9/1991 | Kilheffer et al. | |
| 5,100,277 | A | 3/1992 | Musil | |
| 5,234,128 | A | 8/1993 | Hill | |
| 5,356,238 | A | 10/1994 | Musil et al. | 404/84.1 |
| 5,393,167 | A * | 2/1995 | Fujita et al. | 404/84.1 |
| 5,401,115 | A * | 3/1995 | Musil et al. | 404/72 |
| 5,549,412 | A * | 8/1996 | Malone | 404/84.1 |

(Continued)

FOREIGN PATENT DOCUMENTS

| | | |
|---|---|---|
| EP | 2514872 A1 | 10/2012 |
| EP | 2514873 A1 | 10/2012 |
| EP | 2515195 A1 | 10/2012 |

OTHER PUBLICATIONS

TOPCON Pavelog, http://www.synergypositioning.co.nz/site/synergy/files/Brochures/Brochure%20-%20Topcon%20-%20Pavelog%20.pdf, © 2010 Topcon Corporation. All rights reserved Jun. 2010, 4 pps.

(Continued)

*Primary Examiner* — Tan Q Nguyen
(74) *Attorney, Agent, or Firm* — Matthew M. Hulihan, Esq.; Heslin Rothenberg Farley & Mesiti P.C.

(57) ABSTRACT

Process control for a paving operation is facilitated by obtaining paving material conveyance information for a time period during which paving material is delivered to a screed of a paver by a material conveyance system and distributed over a surface to be paved. The paving material conveyance information includes data indicating incremental advance of the paving material to the screed of the paver during the period of time and data indicating incremental quantity of the paving material at one or more points of the material conveyance system, both of which are correlated to points in time during the time period at which the data is acquired. Incremental quantity of paving material delivered to the screed is determined to facilitate process control in the paving operation.

22 Claims, 16 Drawing Sheets

(56) References Cited

U.S. PATENT DOCUMENTS

| | | | |
|---|---|---|---|
| 5,575,583 A * | 11/1996 | Grembowicz et al. | 404/72 |
| 5,863,149 A * | 1/1999 | Gustin | 404/104 |
| 5,908,459 A | 6/1999 | Rower et al. | |
| 5,947,636 A | 9/1999 | Mara | |
| 6,068,060 A | 5/2000 | Ohtomo et al. | |
| 6,244,782 B1 | 6/2001 | Bitelli | |
| 6,286,607 B1 | 9/2001 | Ohtomo et al. | |
| 6,435,283 B1 | 8/2002 | Ohtomo et al. | |
| 6,439,804 B1 | 8/2002 | Crupi | |
| 6,443,235 B1 | 9/2002 | Ohtomo et al. | |
| 6,520,715 B1 * | 2/2003 | Smith | 404/75 |
| 7,373,108 B2 | 5/2008 | Vidaillac | |
| 7,484,911 B2 * | 2/2009 | Frelich | 404/75 |
| 7,946,787 B2 * | 5/2011 | Glee et al. | 404/84.8 |
| 8,282,312 B2 * | 10/2012 | Braddy et al. | 404/84.05 |
| 2003/0069668 A1 | 4/2003 | Zurn | |
| 2004/0247388 A1 | 12/2004 | Lloyd | |
| 2005/0175412 A1 | 8/2005 | Lloyd | |
| 2006/0045620 A1 * | 3/2006 | Olson et al. | 404/84.1 |
| 2008/0249729 A1 | 10/2008 | Martinez et al. | |
| 2009/0317186 A1 | 12/2009 | Glee et al. | |
| 2010/0106415 A1 | 4/2010 | Pierz et al. | |
| 2010/0121540 A1 | 5/2010 | Kumagai et al. | |
| 2012/0263530 A1 | 10/2012 | Buschmann et al. | |
| 2012/0263532 A1 | 10/2012 | Rutz et al. | |
| 2012/0265371 A1 | 10/2012 | Buschmann et al. | |

OTHER PUBLICATIONS

Pavelog, http://en.roadware.nl/Default.aspx?tabid=1849, Feb. 21, 2012, 2 pps.

Pavelog Online Quality Control for Road Paving, http://www.fgtech.hu/content.php?a=pavelog&locale=en, 2007 © FG-Tech Commercional and Engineering and Consulting LTD., 2 pps.

TopCon Machine Control Catalog, http://www.norsecraftgeo.no/getfile.php/Norsecraft%20Geo/PDF/Catalogue-MC-English-EN-low-final.pdf, Feb. 21, 2012, 16 pps.

MOBA Mobile Automation, http://www.moba.de/en/products/construction/material-control.html, Feb. 21, 2012, 3 pps.

MOBA PAVE-IR System, http://www.moba.de/en/applications/construction-machines/pave-ir-systeme.html, Feb. 21, 2012, 3 pps.

Utilizing GPS to Increase Performance, Murray Lodge, Topcon Positioning Systems, http://rmaces.org/presentations/2011_RMACES/Session_6/equip206-murraylodge.pdf, 2011 RMACES Presentations, 106 pps.

Equipment Used in Bituminous Operations, Section II, http://www.globalsecurity.org/military/library/policy/army/fm/5-436/Chap3.htm, Feb. 28, 2012, 13 pps.

PaveTag, http://www.mindsinc.ca/index.php/servlet/pavetag-applications, Feb. 21, 2012, 4 pps.

Build2Win Logistics—http://www.bid2win.com/products/BUILD2WINLogistics.aspx#Integration, Feb. 21, 2012, 10 pps.

VectrGPS—http://www.hcss.com/Products/VectrGPS/Overview.aspx, Copyright 2011 Heavy Construction Systems Specialists, Inc. (HCSS), 7 pps.

FiveCubits—http://www.fivecubits.com,© 2009 FIVECUBITS, 1 pps.

Millimeter GPS for paving—http://www.topconpositioning.com/products/machine-control/3d/millimeter-gps-paving, Feb. 21, 2012, 2 pps.

Sitelink 3D—http://www.forconstructionpros.com/product/10086332/topcon-positioning-systems-sitelink-3d, Aug. 1, 2007, 10 pps.

Trimble PC S900 Paving Control System—http://www.trimble.com/pcs900-paving-control-system.shtml, © Trimble Navigation Limited 2012, 2 pps.

Pavesmart Grade Control System—http://pavesmart.com/gradecontrolsystem.html, Copyright © PaveSmart 2009, 2 pps.

Trimble CC S900 Compaction Control System—http://www.trimble.com/ccs900.shtml, © Trimble Navigation Limited 2012, 1 pps.

AcePlus—http://www.ammann-group.com/en/home/technology/gps-based-compaction, Feb. 21, 2012, 1 pps.

AccuGrade Compaction—http://www.intelligentcompaction.com/downloads/field_demo/INSoilsIC_OpenHouse_CAT%20IC_Young.pdf, Feb. 28, 2012, 15 pps.

BOMAG Asphalt Manager—http://www.bomag.com/relaunch/microsites/asphalt_manager/worldwide, @ 2007-2012 BOMAG GmbH, 1 pps.

Dynapac Copaction manager for Asphalt—http://www.dynapac.com/products/?product=667&cat=36, Feb. 21, 2012, 1 pps.

Intelligent Compaction for Soils and Asphalt—http://www.dynapac.com/products/?product=667&cat=36, Feb. 21, 2012, 1 pps.

* cited by examiner

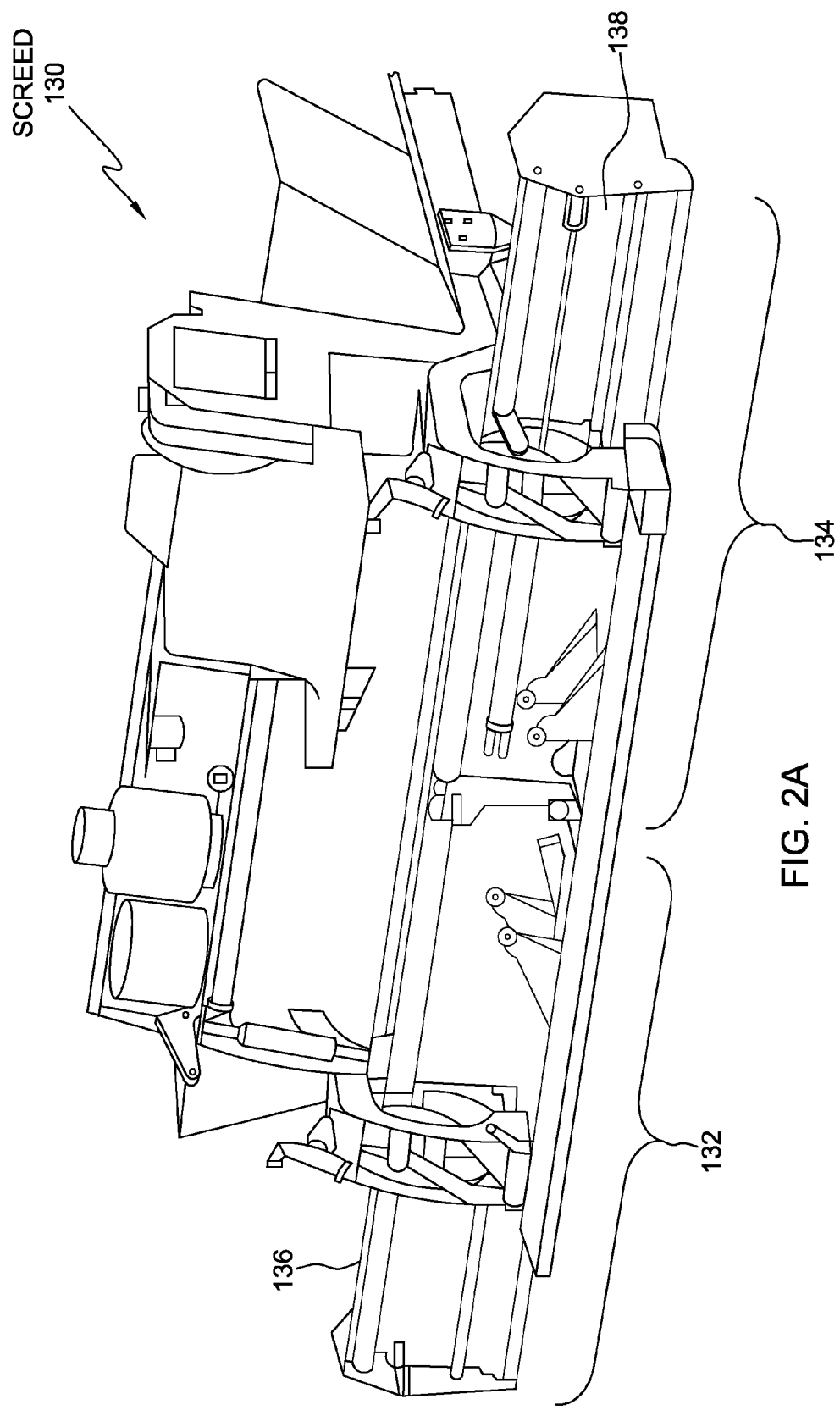

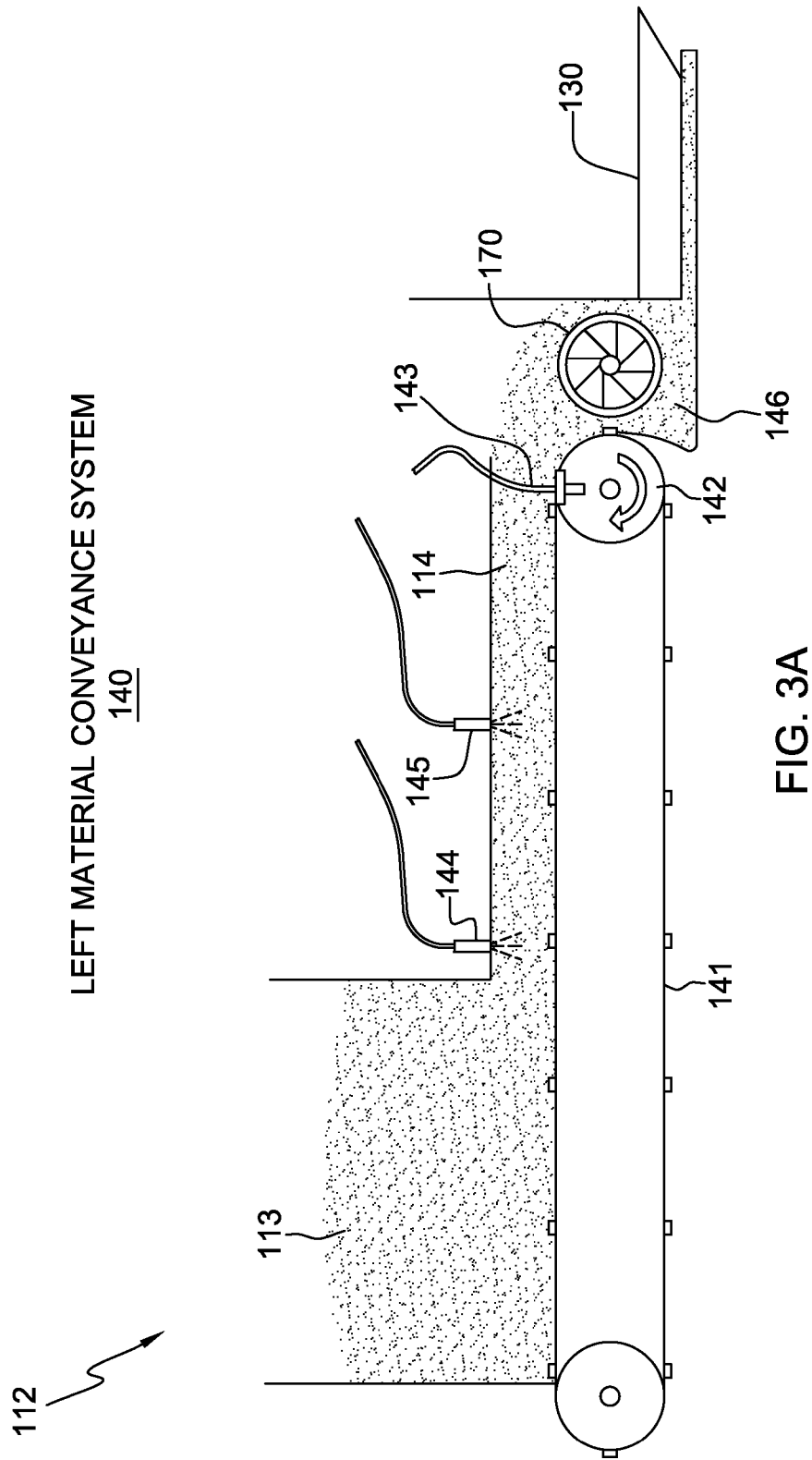

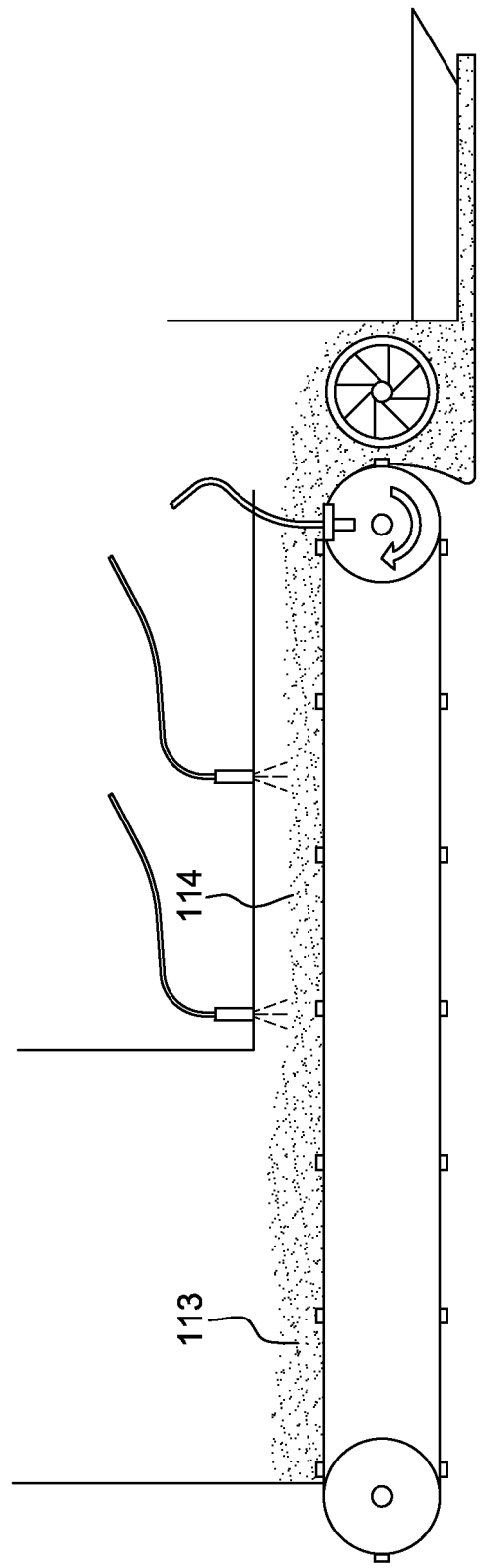

INTEGRATED PAVING PROCESS CONTROL FOR A PAVING OPERATION

TECHNICAL FIELD

This invention relates to paving operations and more particularly to logistical control and integration of paving processes of a paving operation.

BACKGROUND

Mixed paving material such as mixed asphalt is used for high quality paving surfaces for roads, parking lots and other surfaces. The construction of asphalt surfaces (such as those composed of hot mixed asphalt (HMA) and other paving material), requires the accurate and efficient placement of the paving material. The quality of the asphalt surface is directly dependent on the relative control of the material being placed.

Historically, asphalt production, transportation, paving, and compaction is monitored and documented independently and evaluated forensically. A need has arisen for a method to measure, monitor, document, and present an integrated real time evaluation of paving process parameters to provide positive coordination between an asphalt production facility and paving job processes, in order to exercise maximum control over process variables and to facilitate consistent quality results and economically advantageous operations.

BRIEF SUMMARY

The shortcomings of the prior art are overcome and additional advantages are provided through the provision of a method for facilitating process control in a paving operation. The method includes, for instance, obtaining paving material conveyance information for a time period during which paving material is delivered to a screed of a paver by a material conveyance system of the paver and distributed over a surface to be paved, the paving material conveyance information including material advance data indicating incremental advance of the paving material to the screed of the paver during the period of time, and the paving material conveyance information further including material quantity data indicating incremental quantity of the paving material at one or more points of the material conveyance system, wherein the material advance data and material quantity data are correlated to points in time during the time period at which the material advance data and material quantity data are acquired, and determining, based on the obtained paving material conveyance information, incremental quantity of paving material delivered to the screed for the points in time during the time period to facilitate process control in the paving operation.

In addition, a computer system is provided herein for facilitating process control in a paving operation. The computer system includes, for instance, a memory, and a processor in communications with the memory, wherein the computer system is configured to perform obtaining paving material conveyance information for a time period during which paving material is delivered to a screed of a paver by a material conveyance system of the paver and distributed over a surface to be paved, the paving material conveyance information including material advance data indicating incremental advance of the paving material to the screed of the paver during the period of time, and the paving material conveyance information further including material quantity data indicating incremental quantity of the paving material at one or more points of the material conveyance system, wherein the material advance data and material quantity data are correlated to points in time during the time period at which the material advance data and material quantity data are acquired, and determining based on the obtained paving material conveyance information, incremental quantity of paving material delivered to the screed for the points in time during the time period to facilitate process control in the paving operation.

Further, a computer program product is provided for facilitating process control in a paving operation. The computer program product includes, for instance, a non-transitory storage medium readable by a processor and storing instructions for execution by the processor to perform a method that includes obtaining paving material conveyance information for a time period during which paving material is delivered to a screed of a paver by a material conveyance system of the paver and distributed over a surface to be paved, the paving material conveyance information including material advance data indicating incremental advance of the paving material to the screed of the paver during the period of time, and the paving material conveyance information further including material quantity data indicating incremental quantity of the paving material at one or more points of the material conveyance system, wherein the material advance data and material quantity data are correlated to points in time during the time period at which the material advance data and material quantity data are acquired, and determining based on the obtained paving material conveyance information, incremental quantity of paving material delivered to the screed for the points in time during the time period to facilitate process control in the paving operation.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 2A-2B depict further details of an example screed of a paver, in accordance with one or more aspects of the present invention;

FIGS. 3A-3B depict an example material conveyance system of a paver, in accordance with one or more aspects of the present invention;

DETAILED DESCRIPTION

Figure 1A:
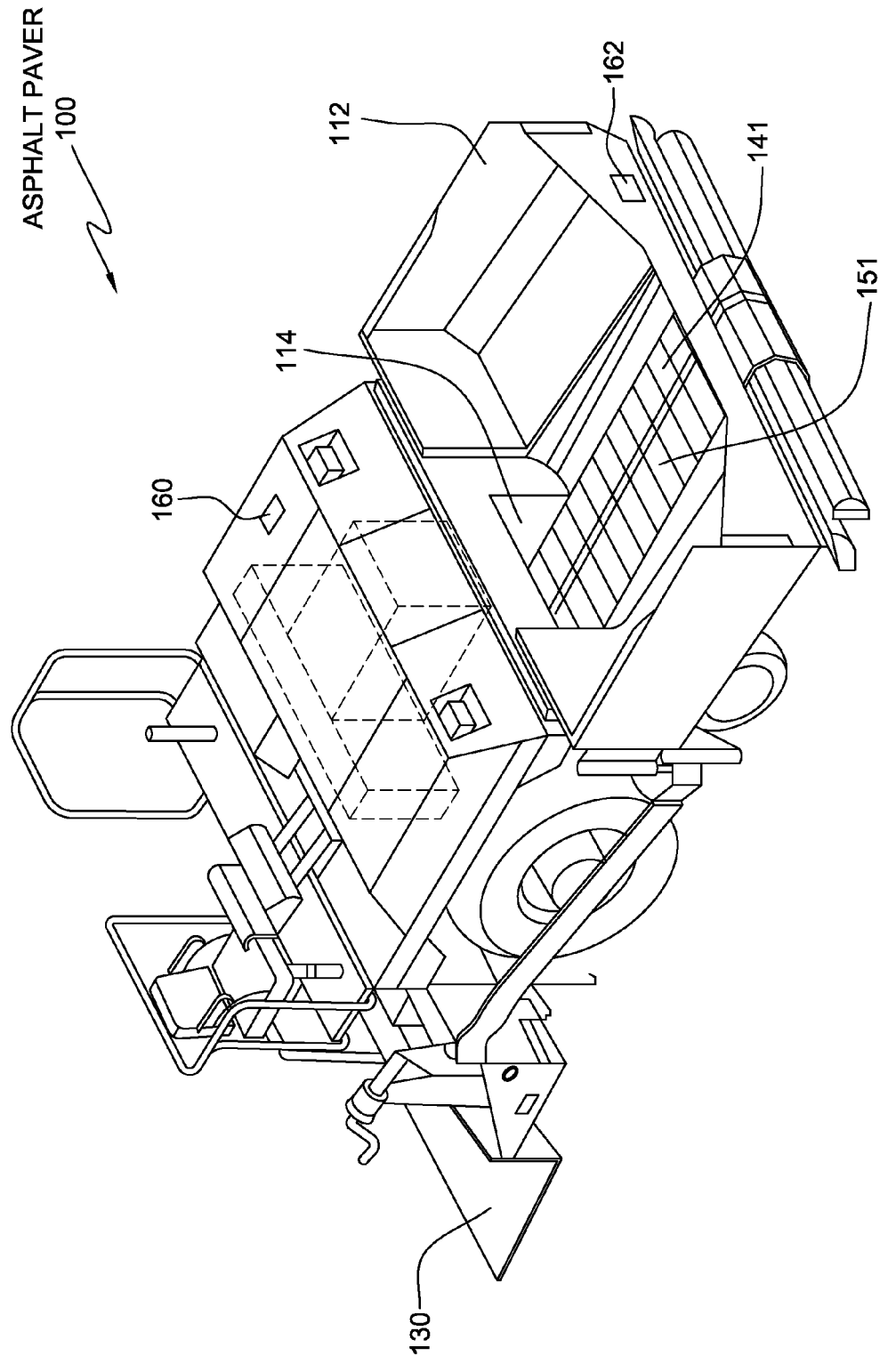
FIGS. 1A-1B depict an example paver and components thereof to incorporate one or more aspects of the present invention.

Aspect of the present invention relate to process monitoring and control of asphalt production, transportation, paving, and compaction. Asphalt can refer to any type of paving material, such as hot mix asphalt (HMA), warm mix asphalt (WMA) and cold mix asphalt (CMA). References herein to paving material, asphalt, HMA, WMA, or CMA should be understood to encompass any of the above types of asphalt.

Research and development in asphalt design, compaction, and pavement life has led to various advances in the field of paving. These advances have a direct economic impact on the asphalt producer and contractor. Today, asphalt producers and contractors are often subject to stringent quality test standards and expectations to produce consistent field results in order to both achieve maximum economic benefit, and avoid economic penalty. In addition, current specifications promulgated at the state and/or national level (such as those by state Department of Transportation (DOT) agencies or the Federal Aviation Administration (FAA)) require the measurement and recording of many variable parameters in the field at the point of actual application of the product (e.g. the asphalt). Acceptance procedures include destructive forensic evaluations of the finished product coupled with material production test results to determine a pay within limits (PWL) factor that is applied to the price paid for the finished product.

Material production, transportation, paving, and compaction are four separate yet critically related processes in providing a high quality finished asphalt pavement. A flow of paving materials in the overall process can be tracked, in terms of quality control. The flow of material follows from the asphalt material production plant to the transportation units, such as asphalt trucks, to the lay-down site, and finally to the paving and compaction of the material on the ground surface.

Current practices in asphalt production and paving fail to sufficiently address process continuity, control, and tracking of material flow. Often, quantitative and qualitative information is lost, which can significantly reduce consistency in overall process control. Additionally, and consequently, the ability to manage and achieve overall process control and consistent quality results is negatively impacted.

Aspects of the present invention are directed to addressing these problems. It is important for an operator of a self propelled paver to have precise control over the amount of paving material being applied over the duration of the project. It is also important to provide accurate location and timing of the incremental (over time and distance) placement of the asphalt, to ensure material deliveries are timely and predictable, and are communicated to the plant and the paver, and to direct and maintain proper and timely coverage and compaction passes by each roller in the compaction effort.

Disadvantages of current practices in asphalt paving and compaction include:

difficulty in accurately measuring and recording, in real-time, the incremental quantity, timing, and location of the asphalt being received by the paver and applied to the surface to be paved;

difficulty in exercising logistical control and real time coordination and communication between the hauling units (asphalt delivery trucks), the paver, and the plant; and difficulty in providing accurate and verifiable timing and performance control between the placement of the asphalt and the time-sensitive rolling pattern by the rollers as part of the compaction effort Testing and analysis has made it possible for purveyors of quality control specifications (such as state DOT agencies or the FAA) to quantify the effects of consistency (or lack thereof) in phases of the process as they relate to life-cycle cost of the pavement and the value added by closely conforming to specified physical attributes. This has spawned an acceptance criteria concept whereby the purveyor is inclined to require stringent compliance to consistency and desired test results. In many instances, the purveyor will base final compensation to paving contractor(s) on a sliding scale based on volumetric test results and consistency in final densities of the finished asphalt. An example scale typically ranges from 90% to 105% of base pay, equating to anywhere from a 10% penalty to a 5% bonus in pay. However, in some instances, if quality results are less than a particular threshold (90% in the above example), the payment can instead go to 0% or the installer may be required to remove and replace the pavement, thereby incurring a great financial cost.

Because of the financial impact (both good and bad) of this acceptance process, installers can employ roadway quality control (QC) technicians to, for instance, manually measure and document (i) physical attributes of the paved material and timing of the process chain elements as they occur, as well as (ii) certain operational parameters such as general location and quantities of asphalt (such as lane and station), thickness of the mat, ambient temperature, temperature of the mix, slope of the pre-paved surface and final paved surface, and average spread rate (also referred to herein as "yield" which is equal to some quantity of material (such as weight) per unit area, i.e. pounds/square yard) of the mix over the accumulating area. This activity by QC technicians necessarily takes place most often in highly demanding and undesirable conditions, such as in heavy or high-speed traffic, variable weather conditions, darkness supported only by limited artificial light, and dangerous working areas in the direct presence of moving heavy equipment and trucks. Also, competing on-the-job demands or general inattention due to other unavoidable factors can detract the attention of the record keeper. This makes it difficult for the technicians to consistently, and in real-time, determine and communicate accurate results of the processes. Furthermore, because some types of asphalt (HMA, WMA) typically must be compacted while it is within a proper temperature range to achieve optimum results, inefficiencies in process control leading to subpar or failing test results cannot be reconciled after the fact. Resulting common logistical and qualitative inefficiencies therefore negatively affect the paving projects.

Mix transportation expense is a significant component of the total expense in asphalt paving. Timely loading and unloading of haul trucks and balancing delivery rates, plant production rates, and field lay down rates present important logistical considerations. Existing solutions that attempt to control the expense of mix hauling involve processes such as manual or RFID-based recordation of the time that the asphalt delivery trucks reach different witness points on the job (arrival, empty, etc.) and identification of trucks by scanning tickets or truck mounted codes, as examples. The focus of these solutions is the hauling unit (truck), giving rise to further problems inherent to the logistics of the trucking process, for instance because the number and identity of the trucks is largely inconsistent and difficult to trace. In contrast, in accordance with an aspect of the present invention and as described in farther detail below, mix transportation and conveyance control can be facilitated via a logical comparison between known weight of asphalt on the hauling truck(s) and what is known to have passed through the paver to the screed during the paving process.

Also common to paving projects is the potential discrepancy between the quantity of material required versus the quantity of material ordered and shipped. Waste is the surplus of ordered/shipped material compared to what is actually required for the job. Controlling the amount of end-of-day waste is important from a cost-control standpoint. In order to control the amount of end-of-day waste, an accurate forecast of material requirements is estimated, for instance by a foreman. Many times, trucks and asphalt plant operations are put on hold while this forecast is exacted, or, alternatively and perhaps additionally, a relatively large amount of mix is shipped to the job to assure that the mix does not run short. Both of these result in inefficient material forecasting and handling, and potential for significant waste. Also, in some circumstances, there is only a small deficiency in material needed to complete the job, which can push the final completion to a next work-shift at an extremely high cost when only a small (and relatively inexpensive) amount of mix is needed. Some approaches to calculating/forecasting a yield involve manual estimation of the amount of mix passing through the paver over a measured area. These approaches have associated with them many limitations and inefficiencies including:

The estimation of material used is often based on a relatively inaccurate visual judgment to estimate the amount of material remaining in the paver (material not used); the accuracy of this method is often poor and inconsistent because it depends on subjective observations Inaccurate measurement of the surface area covered when the width of the paving surface (area to be paved) is variable or irregular It averages the spread of mix over the full screed width. There are often variable conditions and other inconsistencies between the left and right sides of the screed that can have a significant effect on the yield. Examples of such inconsistencies across the width of the screed include a change in relative slope of the paving surface from left and right, and the presence/absence of a supported edge The present invention provides, in part, logistical integration and correlation between the asphalt manufacturing plant, the haul trucks, and the paving and compaction operations. The measurement and timing of the mix as it is dispatched from the asphalt plant with individual truck weight records (weight tickets) is associated with the measurement, location, and timing of the accumulating quantity of the mix flowing through the paver, and more specifically to the screed and onto the paving surface. Precise quantity (from which weight/mass can be determined) measurement and allocation of paving material applied to a surface to be paved is provided. This facilitates provision of automatic, real-time solutions to problems identified above. The present invention provides correlations between measurements and real-time calculation of operating parameters which are automatically referenced as to time and location, to provide enhanced yield control in a paving operation. For instance, the gathered information can be used to make determinations about adjustments that should be made at the paver to control material yield, at the plant to control the trucking operations and delivery of materials, at the rollers to control the compaction process, or by a site quality control (QC) technician to prevent waste of material, as examples.

Figure 1B:
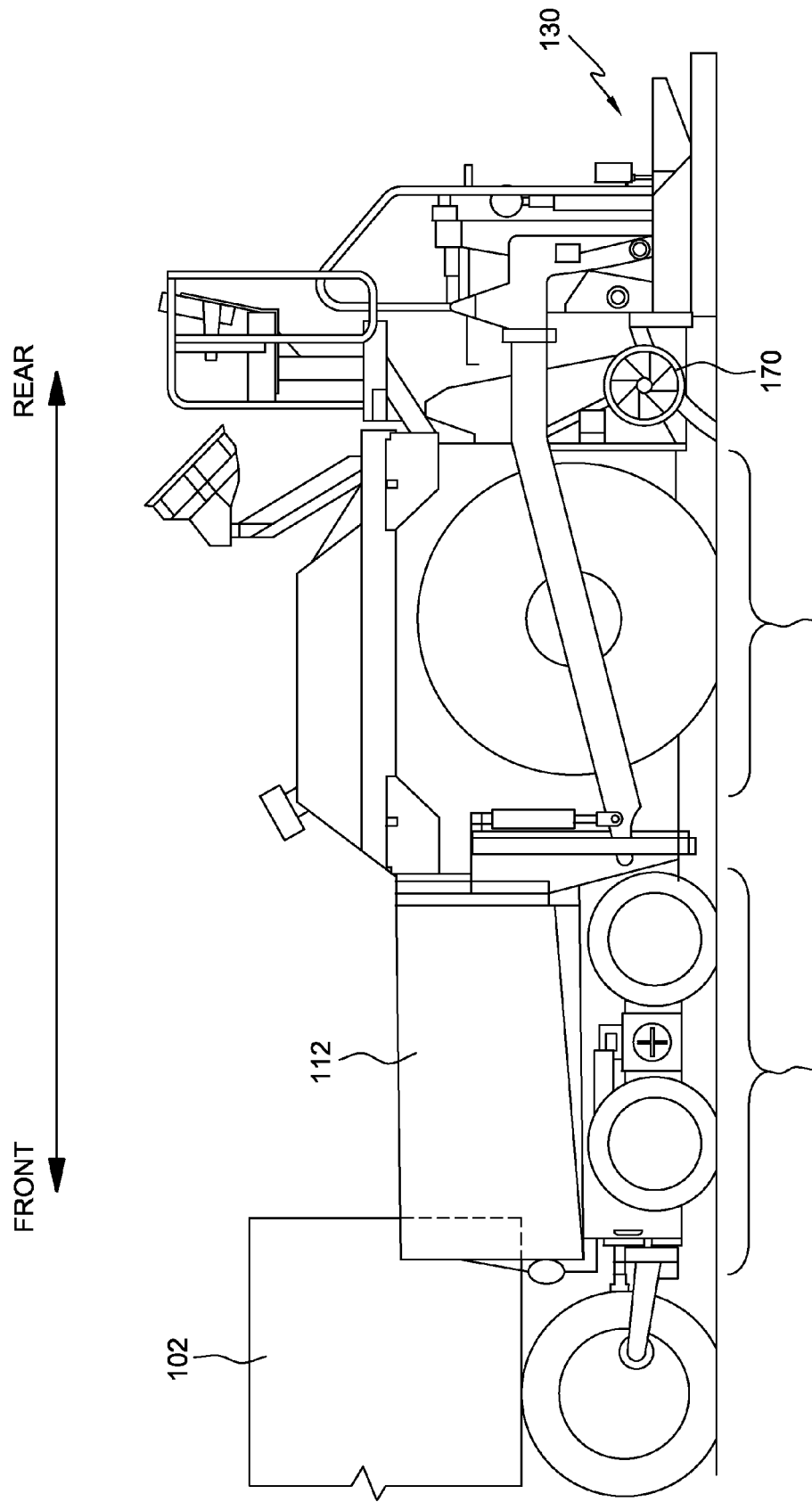

An asphalt paver to incorporate and use one or more aspects of the present invention is depicted and described with reference to FIGS. 1A-4. Referring to FIGS. 1A and 1B, asphalt paver 100 comprises three main components: a hopper portion 110, a tractor drive system 120 for movement of the asphalt paver, and a vibratory paving screed 130. The tractor drive system 120 propels asphalt paver 100 and can optionally provide power to other components of paver 100. Hopper portion 110 includes a hopper 112 located towards the front of paver 100. Hopper 112 receives paving material from an asphalt delivery truck 102 or other loading device and is capable of storing a surplus of material to facilitate uniform unloading of delivery trucks and smooth (i.e. consistent and continual) operation of paver 100.

Referring collectively to FIGS. 1A, 1B, 2A and 2B, hopper portion 110 includes a left conveyor 141 and a right conveyor 151 that convey paving material from hopper 112 to screed 130 through a fixed size conveyor tunnel 114. Paving material is supplied to a left side 132 of screed 130, defined from approximately the center of the main screed to the outer point of a left screed extension 136, by a left conveyor 141. Similarly, material is supplied to a right side 134 of screed 130, defined from approximately the center of the main screed to the outer point of a right screed extension 138, by a right conveyor 151. A left auger 170 and right auger (not pictured) are positioned in front of screed 130 and distribute the material (flowing on conveyors 141, 151 from the hopper to the screed) across the operating width of screed 130. Additionally, a proximity sensor 162, such as one employing a laser, sonar, magnetic, or optical technology, is provided to sense the physical presence/movement of a truck (e.g. 102) directly in front of paver 100, and can communicate via a wired or wireless data communication path to a local or remote computer system to signal the computer system each time a truck enters/leaves a specified zone in front of paver 100.

FIGS. 3A and 3B depict an example left material conveyance system 140 extending from hopper portion 110 to screed 130 towards the real of the paver, in accordance with one or more aspects of the present invention. FIG. 3A depicts a scenario in which hopper 112 contains a relatively large quantity of material 113. Since hopper 112 contains such a large quantity of material, a relatively large amount of material 113 passes on left conveyor 141 to left auger 170 for distribution of the material below screed 130. In contrast, FIG. 3B depicts a scenario in which hopper 112 is nearing exhaustion of its supply of material 113, and therefore a relatively small amount of material 113 (as depicted by the lower height of material on conveyor 141) passes on left conveyor 141 to left auger 170 for distribution of the material below screed 130. In both cases, left material conveyance system 140 conveys material to left side 132 of screed 130. Left material conveyance system 140 is operable by an automated variable speed conveyor drive system 142 which in this example comprises one or more wheels. Variable speed conveyor drive system 142 drives movement of left conveyor 141.

Left material conveyance system 140 is provided with a separate motion detection device 143 to sense and record movement of variable speed conveyor drive system 142 (and consequently of left conveyor 141). The movement of the conveyor indicates incremental advance of paving material on the conveyor and is, in one example, recorded in time-value data pairs as a portion of recorded material conveyance information, in which each measurement (recorded as a data value) is associated with a time at which the measurement was taken, and the measurement and time values are recorded together. One example of a motion detection device comprises a magnetic pick up device mounted adjacent to a gear in variable speed conveyor drive conveyor system 142, however those having, ordinary skill in the art will recognize many other devices and/or methods for detecting motion of the variable speed conveyor drive system 142 and/or left conveyor 141. In one particular embodiment, a count of unit rotational advance of variable speed conveyor drive system 142 is acquired based on electrical pulses provided by motion detection device 143 to a receiving unit, such as an on-board or remote computer system (e.g. a programmable logic controller) in data communication with motion detection device 143. Additionally, motion detection device 143 is provided to indicate motion of variable speed conveyor drive system 142 is operable to determine absolute relative speed of conveyor 141 in comparison to a speed of (right side) conveyor 151, which motion may be detected via a separate motion detection device (not pictured). The relationship in speeds of left conveyor 141 and right conveyor 151 can range from 0%, if one conveyor is not moving and the other one is moving, to 100%, in which both conveyors move at the same speed. Relative speed of conveyor 141 as compared to a speed of right side conveyor 151 is important. The relationship in speeds between the conveyors is important to determining the quantity of material delivered by a conveyor because the speed of one conveyor can affect the quantity of material delivered by the other conveyor. For instance, it was found in one example that a single moving conveyor delivered 7% less material per unit advance of the conveyor when its counterpart conveyor was stationary as compared to when its counterpart conveyor was moving at the same relative speed. In one example, the quantity of material delivered by one conveyor decreases linearly as the other conveyor's relative speed decreases from 100% to 0% of the speed of the one conveyor. Thus, the material delivered by a single conveyor can be partially dependent on the speed of the other conveyor. A calibration value (termed the 'relative speed calibration value') based on this relationship in speed between the two conveyors is determined and recorded in time-value data pairs. An 'effective' count of advance of a conveyor is therefore be adjusted (as described below) in order to account for this dependency.

Additionally, according to an aspect of the present invention, one or more material height sensors 144 are provided in conveyor tunnel 114 above left conveyor 141 and right conveyor 151 to sense and send a signal of material quantity data indicated by the incremental height of the material on left conveyor 141 and right conveyor 151 in conveyor tunnel 114. Material height sensor(s) 144 measure height of material 113 passing through conveyor tunnel 114 on left conveyor 141 and height of material 113 passing through conveyor tunnel 114 on right conveyor 151, and, as before, records these measurements in time-value data pairs as part of the material conveyance information that is recorded. Material height on a conveyor is indicative of quantity of the material thereon and passing through the tunnel to the screed. Material height sensor(s) can include a non-contacting sensor, a contacting sensor, or both.

Material height in tunnel 114 at a particular point is directly related to quantity of paving material on the conveyor at that point, and therefore incremental material height measurement is an indication of the incremental quantity of material at that point. Incremental quantity of material passing through the conveyor tunnel can be determined from the sensed material height and the movement of the conveyor (collectively, the material conveyance information). Measurements of material height are synchronized with data provided by motion detection device 143, such as a rotational count of variable speed conveyor drive system 142. The material height measurement is assigned to a time-value data pair that will be applied to each actual count interval (i.e. the occurrence of each count), adjusting the single count value by a percentage that the conveyor was full, as indicated by the material height sensor. Additionally, the relative speed calibration value from above is applied to each count of motion detection device 143, since, as previously described, the speed of a counterpart conveyor can affect material delivery for a conveyor. The result is adjusted or "effective" count. By way of specific example, assume that the effective count is to be determined for each single count detected (In other examples, the effective count might be determined every 2, 5, or 10 detected counts, or every X number of seconds, for instance). When a next count occurs, assume it is determined that the material height in the tunnel was 95% (of max) and the conveyor was operating 100% faster than its counterpart (i.e. and therefore 7% less material is delivered than if the counterpart was running at the same speed). Then, the effective count would be equal to (i) 1 (# of actual counts in this effective count determination) multiplied by (ii) 0.95 (conveyor 95%) multiplied by (ii) 0.93 (relative speed calibration)=0.8835 adjusted count, or effective count.

A known relationship between this effective count advance of variable speed conveyor drive system 142 and the quantity of material 113 flowing through tunnel 114 is used to determine the incremental quantity (in one example weight) of material delivered to the screed over time (e.g. at many points in time, corresponding to the points in time of the recorded time-value pairs) during a paving operation. In one example, this known relationship (termed a calibration value) is predetermined for the paver by moving a known weight of asphalt through the paver, and dividing the known weight moved through the paver by an accumulated 'effective' count to deliver the known weight of material. This serves as a baseline calibration value which can be applied to determine the weight of material delivered by a number of effective counts during an actual paving operation. The calibration value can be developed over a rather short period of time. The value will be substantially consistent from mix to mix, with any variability likely being caused by a difference in specific gravity between mixes. Practically, once a calibration value is determined for a particular machine, that calibration value will provide a very accurate baseline value to apply against later asphalt quantity measurements flowing through the paver (for instance on subsequent pulls, shifts and paving operations employing the paver).

Thus, the calibration value is then used to allocate the measured quantity of asphalt material flowing through the paver over time and convert it to weight, providing incremental weight paved over time, in accordance with aspects of the present invention. Aspects of the above, such as obtaining material height and motion measurements, determining effective count advance and the calibration values, and performing calculations to determine allocated quantities of asphalt delivered to the screed over time, are facilitated by way of one or more computer systems located at the paver, remote from the paver, or a combination of the two.

Additionally provided in conveyor tunnel 114 is one or more temperature sensors 145 to monitor and record temperature of the mix on a pre-set frequency (such as every 5 seconds, which can be specified/adjusted by an operator at any time), again in time-value data pairs. Sensing and properly controlling mix temperature is important to a variety of process components including the compaction effort.

A right side material conveyance system (not pictured) analogous to left material conveyance system 140 described above and having a right side variable speed conveyor drive system can be provided to supply material to the right side 134 of the screed 130. Right material conveyance system is similarly operable to convey material to right side 134 of screed 130, and includes a separate set of components (drive system, material height sensor, temperature sensor, etc.) to sense/record the same conveyance information discussed above. Separating the two material conveyance and drive systems enables material supply and distribution to the left 132 and right 134 sides of screed 130 to occur at different rates, as needed to maintain a desired level ('head') 146 of material on each side 132 and 134 of the screed 130.

Figure 2B:
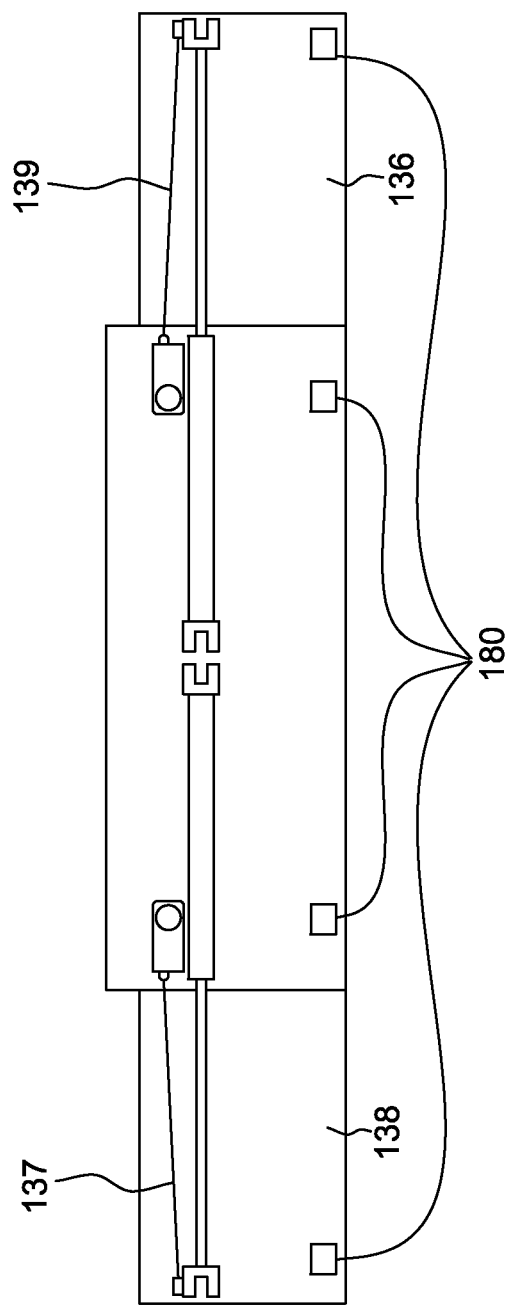

Further details of screed 130 are provided with reference to FIGS. 2A and 2B. FIG. 2A depicts the rear of the paver (looking from behind), while FIG. 2B depicts a rear view of screed 130 detached from paver 100 (i.e. looking from the front of the paver to the rear. During normal operation, screed 130 is operable in a transport mode (up position) or in a pave mode (down or 'float' position). Screed 130 is provided with left (136) and right (138) screed extensions extending outwardly to widen a horizontal area across which screed 130 distributes material. To facilitate aspects of the present invention described below, distance sensors 137 and 139 are provided to measure and record the incremental position (i.e. length of outward extension) of the left screed extension 136 and right screed extension 138, respectively, in time-value data pairs. This is used to determine the horizontal span of the screed, which correlates to a screed width dimension indicative of the width of the mat as it is paved. Additionally, one or more slope sensors 180 are provided on screed 130 including the left (136) and right (138) side screed extensions to measure the slope of the screed (left side, right side, left screed extension, right screed extension) over time, in time-value data pairs.

Figure 4:
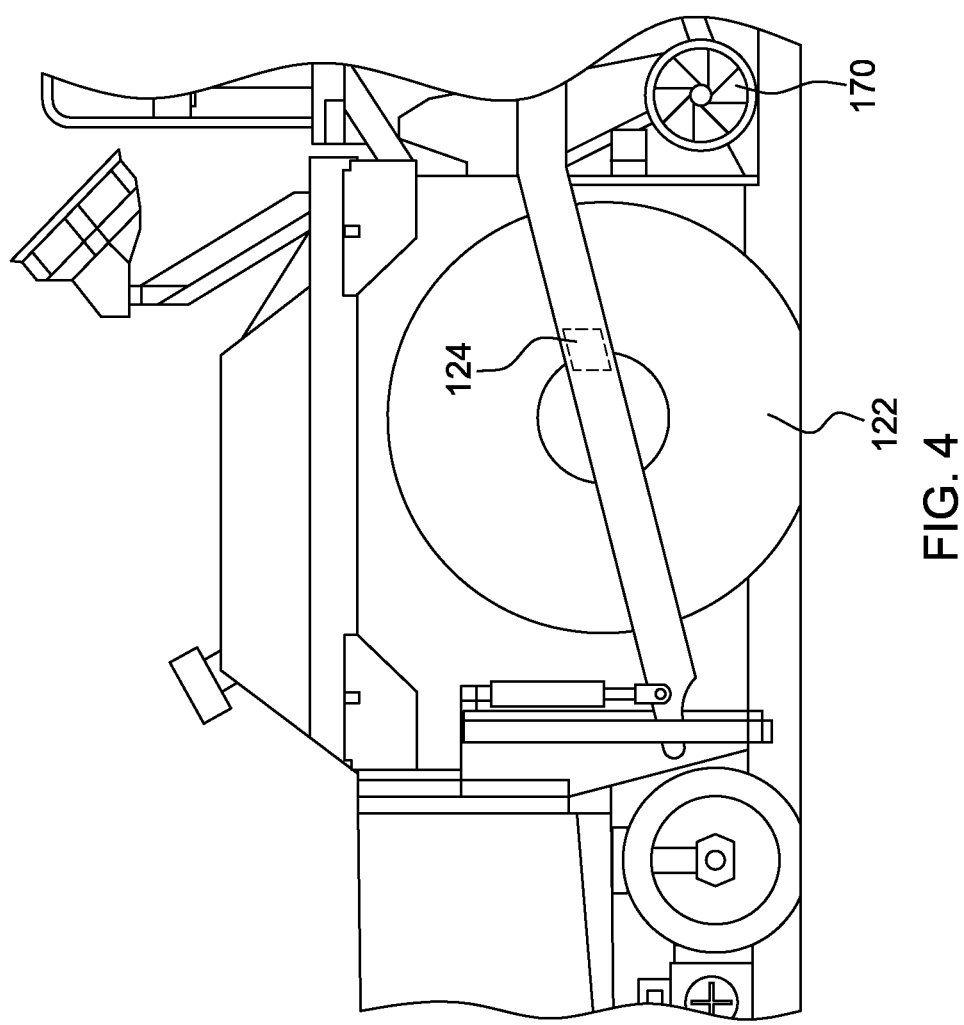
FIG. 4 depicts further details of an example tractor drive system of a paver, in accordance with one or more aspects of the present invention.

Further details of an example tractor drive system 120 of paver 100 are provided with reference to FIG. 4, depicting a view of tractor drive system 120 from the left side of paver 100. Tractor drive system 120 is operable by drive wheels on each side of the paver (e.g. left side tractor drive wheel 122 and right side tractor drive wheel, not pictured) either in direct contact with the paving surface or in direct contact with an endless track arrangement, as is appreciated by those having ordinary skill in the art. In accordance with an aspect of the present invention, drive wheel 122 is provided with a motion pickup device 124 to sense and record, in time-value data pairs, motion of tractor drive wheel 122, and consequently forward movement, including speed of paver 100. In one example, motion pickup device 124 comprises a magnetic pickup device mounted adjacent to a gear of the drive system. A known relationship between linear advance (in a departure direction) of the tractor and a count of electrical pulses provided (in one example to an on-board or remote computer system) by motion pick up device 124 is converted into a quantitative signal representing the distance of linear advance of the paver. A departure value of paver 100 is set to zero, or, alternatively, referenced to a known departure station value at the start of each 'pull', and will count up, in one example, with each consecutive pull completed. Those having ordinary skill in the art will recognize that a pull refers to a continuous forward motion of the paver once the screed is lowered from a transport position into the paving position. A pull ends when the screed is lifted from the paving position. A sensor can be provided to determine the position—e.g. up or down—of the screed, in order to determine the beginning and ending of each pull, and log this in time-value data pairs.

According to aspects of the present invention, the departure value is referenced by a GPS device 160 (FIG. 1A) operable to provide GPS-based location information (such as coordinates) at predetermined intervals of time of the measured advance of the paver as the paver progresses along the pull(s), and optionally referenced by lane number of the paving plan.

As noted previously, the measurements taken above by the various sensors can be provided via one or more wired or wireless communication links to one or more computer systems. In one example, the measurements are provided directly to a local computer system (i.e. one which is located on or at the paver) having one or more input components (such as hardware-based communications ports including USB or serial ports, or network adapters, as examples) for receiving the measurements and one or more processors to facilitate storing, processing, and/or transmitting the measurements. The measurements may be recorded by the local computer system and/or provided/recorded to one or more remote computer systems. Example computer system(s) for receiving measurements and/or recording data are depicted and described with reference to FIGS. 11 & 12.

Thus, in accordance with aspects of the present invention, information determined based, at least partially, on measurements provided by components of paver 100 include: 1. Incremental calibrated weight of mix provided over time to each of the left side of the screed and the right side of the screed; 2. Incremental width over time of each of the left side of the screed and the right side of the screed; 3. Incremental distance over time travelled by the paver; 4. Temperature of the mix at the screed over time; 5. Location of the paver referenced by lane number of the paving plan; and 6. Slope of the screed over time, (left side, left extension, right side, right extension). This determined paved mat dimensional information facilitates construction of a timed-referenced material placement map of the quantity of material that has been paved. The map includes the departure (linear advance) dimension and a screed width dimension of one of more pulls (a typical stretch of highway, for instance, would include multiple pulls. The time-reference material placement map is referenced by time-value data pairs of (i) departure, (ii) effective count (corresponding to movement of the paver), (iii) screed width, and (iv) asphalt temperature. Additionally, in accordance with an aspect of the present invention, the time-referenced material placement map includes a yield dimension indicating quantities of material delivered to the screed at various locations of the paved mat. The yield dimension is determined based on incremental quantity of material paved over time and can indicate thickness of the mat. In one example, the yield dimension is determined by correlating the determined incremental quantity of material deposited over time to a particular area (screed width by linear advance distance) paved.

Figure 5:
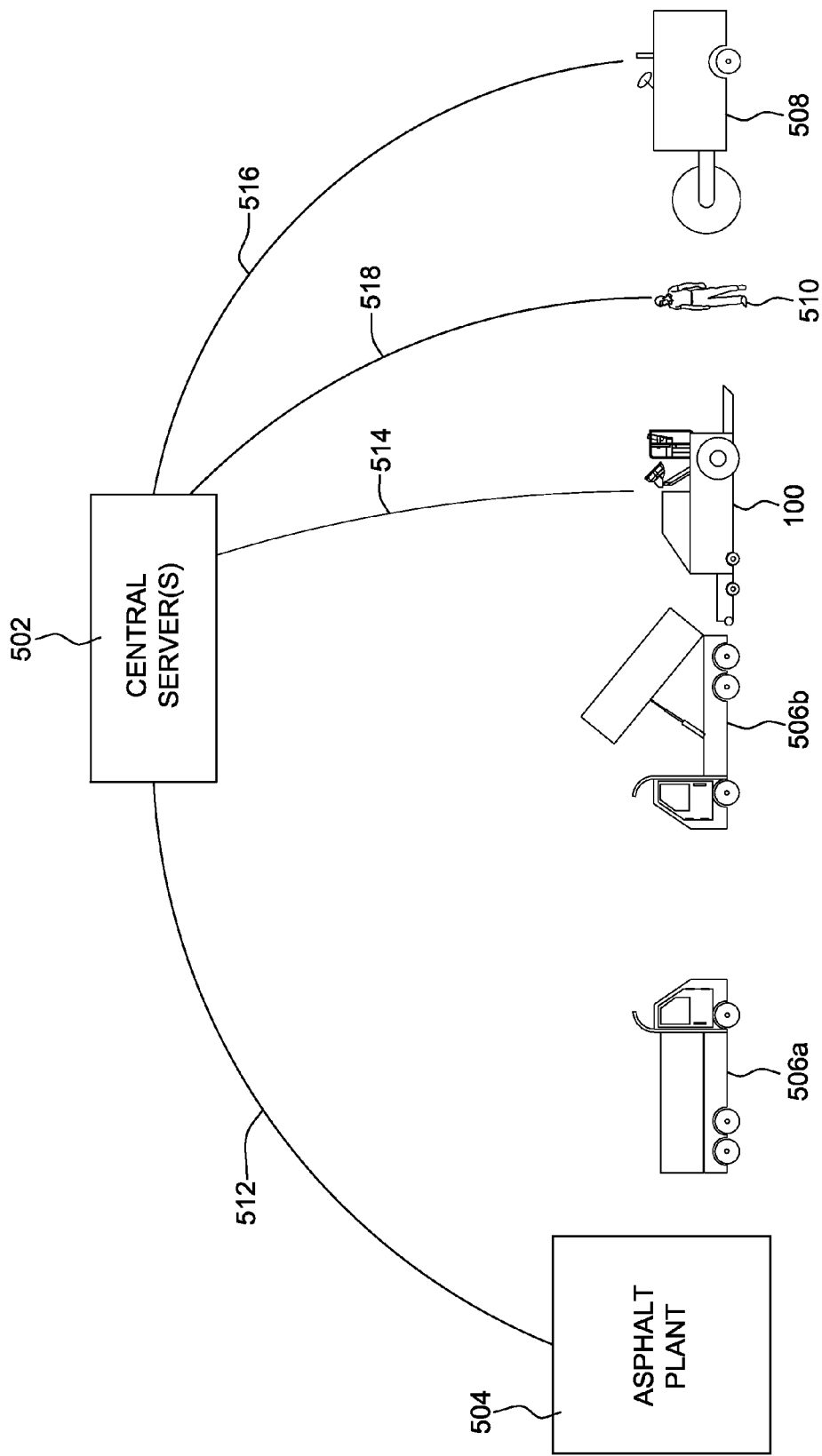
FIG. 5 depicts an example data communications environment for an integrated asphalt paving process, in accordance with one or more aspects of the present invention.

An integrated asphalt paving process in accordance with aspects of the present invention involves, in one example, data communication between several entities including an asphalt paver, an asphalt plant weigh scale, roller(s) for compacting the asphalt, and a quality control (QC) technician. Data communicated between these entities is facilitated via any suitable device(s) supporting data communication, such as one or more computer systems connected via one or more wired or wireless communications links. In one example, data is communicated from each entity to one or more central server(s) that accumulate the received data in a storage or other memory device and/or process the received data. FIG. 5 depicts an example data communications environment for an integrated asphalt paving process in accordance with one or more aspects of the present invention. In FIG. 5, central server(s) 502 send/receive data to/from; asphalt plant 504 over communication link(s) 512; paver 100 over communications link(s) 514; roller 508 over communications link(s) 516; and QC technician 510 over communications link(s) 518. Additionally depicted is truck 506a heading to paver 100, and truck 506b currently unloading material into paver 100.

Example communications links include one or more digital or analog connections operating via wired or wireless technology to facilitate communication between systems. As will be appreciated by those having ordinary skill in the art, communication links in FIG. 5 could be any form of communications technology capable of communicating data. As an example, the communications links may be any type of network connection such as a local area network (LAN), a wide area network (WAN), a token ring, an Ethernet connection, etc., or a connection employing near-field communication such as RFID or employing a Bluetooth™ protocol.

In FIG. 5, data (such as measured information and/or values calculated by computer system(s) at the paver, rollers, QC technician, or asphalt plant based on measured information) is provided to central server(s) 502. While central server(s) 502 are depicted being generally remote from each of the paver, asphalt plant, trucks, roller, and QC technician (collectively the "entities"), those having ordinary skill in the art will appreciate that the central server(s) 502 may in fact be located local to paver 100 and/or other entity in FIG. 5. Alternatively or additionally, central server(s) 520 could comprise several components, one or more of which being located local to an entity in FIG. 5, and one or more of which being located remote to the entities depicted in FIG. 5 (such as at an offsite web services provider).

Central server(s) 502 receives data and information gathered and provided by asphalt plant 504, paver 100, roller 508, and QC technician 510 (e.g. by one or more computer systems employed at/by those entities). In one example, this information and data is communicated wirelessly from each of these components to central server(s) 502. Data and information received by central server(s) 502 includes measurement data (optionally time-stamped as time-value data pairs), for instance material conveyance information and other data from paver 100 provided by the individual measurement devices thereof or by a computer system at paver 100 which receives the measurement data, optionally processes it, and provides it to central server(s) 502.

Data and information is gathered at paver 100, optionally displayed at the paver on one or more display devices, and optionally transmitted to central server(s) 502. Such data and information can include (all optionally date, time, and position referenced): job identification information (such as job number and/or project identifier supplied as an alpha-numeric entry keyed-in by an operator); mix type and use; fixed screed width; record frequency (defining the interval at which time-value pairs are recorded, based on one or more of distance travelled, quantity of asphalt used, or elapsed time); initial position setting (e.g. lane designation and departure station of the paver); accumulated area paved (divided into area paved by left side of screed, area paved by right side of screed, and total area paved); accumulated weight (in tons or other appropriate unit) of asphalt through the paver (divided into weight distributed to left side of screed, weight distributed to right side of screed, and total weight of asphalt distributed); accumulated average yield (divided into yield of left side of screed, yield of right side of screed, total yield); instantaneous yield (divided into instantaneous yield at left side of screed, instantaneous yield at right side of screed, and total instantaneous yield); sequential pull number (sequential number of the production pull, with each pull starting when screed is in paving position and ending when screed is lifted); screed width and slope (including left side of screed, right side of screed, and total screed width and slope, measured in one example periodically according a frequency specified/adjustable by a paver operator); job station of the each pull from its respective starting point, related to a reference job station; distance traveled by the paver during the current pull; accumulating material volume; paver operating status (operating mode, screed position, etc.); asphalt temperature values (for instance instant temperature, average temperature, etc.); and other paver operating information, such as engine metrics (rpm, temperature, fuel consumption, etc), ambient air temperature, and machine operating hours. In one particular embodiment, this information is obtained and determined at paver 100, for instance by a computer system thereof, and provided by paver 100 to the central server(s) 502. In another embodiment, one or more of these are calculated by central server(s) 502 based on data that is measured at paver 100 using one or more of the measurement components described above and supplied to the central server(s) 502 from paver 100.

Data and information gathered at asphalt plant 504 and optionally transmitted to central server(s) 502 include (all optionally date, time and job referenced): identification information such as individual truck, job, customer, date, accounting data, shipping location; load information such as tare weight of each load and/or accumulating weight of mix sent; load number, scale time (same as truck starting time, i.e. time of truck departure from the plant), material type; and one way travel time of each of the trucks. In one particular embodiment, this information is provided directly to central server(s) 502. In another embodiment, one or more of these are calculated by central server(s) based on received measurement data from plant 504.

Data and information gathered at the rollers and optionally transmitted to central server(s) 502 include (all optionally date, time and job referenced): paved mat departure; actual horizontal position on the mat; direction of travel; and relative location of roller 508 on the paved mat over time. In one example, central server(s) 502 receive the above information after being calculated by another computing system, such as a computer system located at the rollers or the paver. In another embodiment, one or more of these are calculated by central server(s) based on received measurement data from rollers. Additionally, in one embodiment, this information is transmitted directly to the central server(s) from the rollers, while in another embodiment, the above information is transmitted to the central servers by way of a computer system, such as a remote terminal unit (RTU), of the paver, wherein the information is received from the rollers by the RTU at the paver, and the RTU provides the information to the central server(s) over a communications path between the paver and central server(s).

Data and information obtained by QC technician 510 and optionally transmitted (for instance via a mobile processing device) to central server(s) 502 can include (all optionally date, time, and job referenced): identification of each roller in the compaction effort; operating order of the rollers; and parameters of the compaction effort such as the number of passes for each roller to deliver the planned compaction effort, the number of passes for each roller for a complete coverage, and the timing range for each roller based on the timing of the mat placement. In one example, central server(s) 502 receive some of the above information from another computing system, such as a computer system located at the QC technician or the paver. In another embodiment, one or more of these are calculated by central server(s) based on received measurement data from, e.g. the QC technician. Additionally, in one embodiment, this information is transmitted directly to the central server(s) from the QC technician, while in another embodiment, the above information is transmitted to the central servers by way of a computer system, such as a remote terminal unit (RTU), of the paver, wherein the information is received from the QC technician by the RTU at the paver, and the RTU provides the information to the central server(s) over a communications path between the paver and central server(s).

Central server(s) 502 can aggregate the above transmitted data and provide the following real time actionable production and paving process control products in the form of feedback displayed to/at (for instance on remote displays) one or more of paver 100, rollers 508, asphalt plant 504, or QC technician 510 as specified by the user, and can also provide real time display of results of corrective actions taken, as described in further detail below:

Job Identification information, initial position information of current pull (lane and station)
Pull # of current shift
Departure distance of current pull
Instant timed screed width
Accumulating area for current pull and current shift
Accumulating material volume delivered to the screed, for current pull and current shift
Instant yield for current pull, timed and location referenced
Average yield for current pull and current shift, timed and location referenced
Timed and position referenced mix temperature values, screed width, and screed slope values
Log of paving speed and paver stops during production
Paver engine operating metrics, time and position referenced
Actual timed position of each load and accumulating volume, and instant yield
Calculated individual truck release time (empty)
In transit to the job material manifest in real time
Returning to the plant 'empty' truck manifest in real time
Trucking performance data by individual load, by truck, and average for the shift
Calculation of truck estimated time of arrival (ETA) at the plant and at the paver based on real time traffic conditions using a commercial mapping product.
Actual timed position map of roller performance data, by roller, including speed and stops
Dynamic real time roller operating instructions and prompts Thus, measurement devices, computer systems, and other components located at the data sources (asphalt plant, paver, QC technician, and roller) receive and send data and information to and from central server(s) 502. Central server(s) 502 can store, correlate, and process the data and communicate real time results with each data source. Central server(s) 502 can provide data recordation and storage and can provide information to one or more of the asphalt plant, paver, rollers, and QC technician.

As an example, central server(s) 502 can provide the following information back to the paver (all optionally date, time, and job referenced): job identification information; sequential tally of loads—Individual weight and accumulated weight per truck #; unloaded time for each truck from job—each load release; accumulating area paved (left screed, right screed, total); accumulated weight (in, e.g., tons) through paver (left screed, right screed, total); accumulated average yield (left screed, right screed, total); instant yield (left screed, right screed, total); temperature (instantaneous, average, etc); instantaneous screed slope and position; current position of the paver; distance this pull; sequential pull number; loads between plant and paver referenced by truck #, weight (in, e.g., tons), total, ETA; and trucks unloaded and headed back to the plant—Truck #, and ETA.

Further, central server(s) 502 can provide the following information to asphalt plant 504 (all optionally date, time, and job referenced): job identification information; sequential tally of loads—Individual weight and accumulated weight per truck #; unloaded time for each truck from job—each load release; loads between plant and paver—truck #, tons, total, ETA; and trucks unloaded headed back to plant—Truck #, and ETA.

Central server(s) 502 can provide roller guidance information to roller(s) 508 and QC technician 510 (i.e. a quality control system of roller 508 or QC technician 510). The roller guidance information can indicate current roller position and proper roller positioning on the paved mat (such as on the time-referenced material placement map described above) to facilitate the compaction effort, such as control of operation of the rollers.

The data and information exchanged as described above can be used to advantageously monitor and control various aspects of mix production, mix delivery, paving of the mix, and the compaction effort as part of an integrated paving process, further details of which are provided with reference to FIGS. 6-10.

Figure 6:
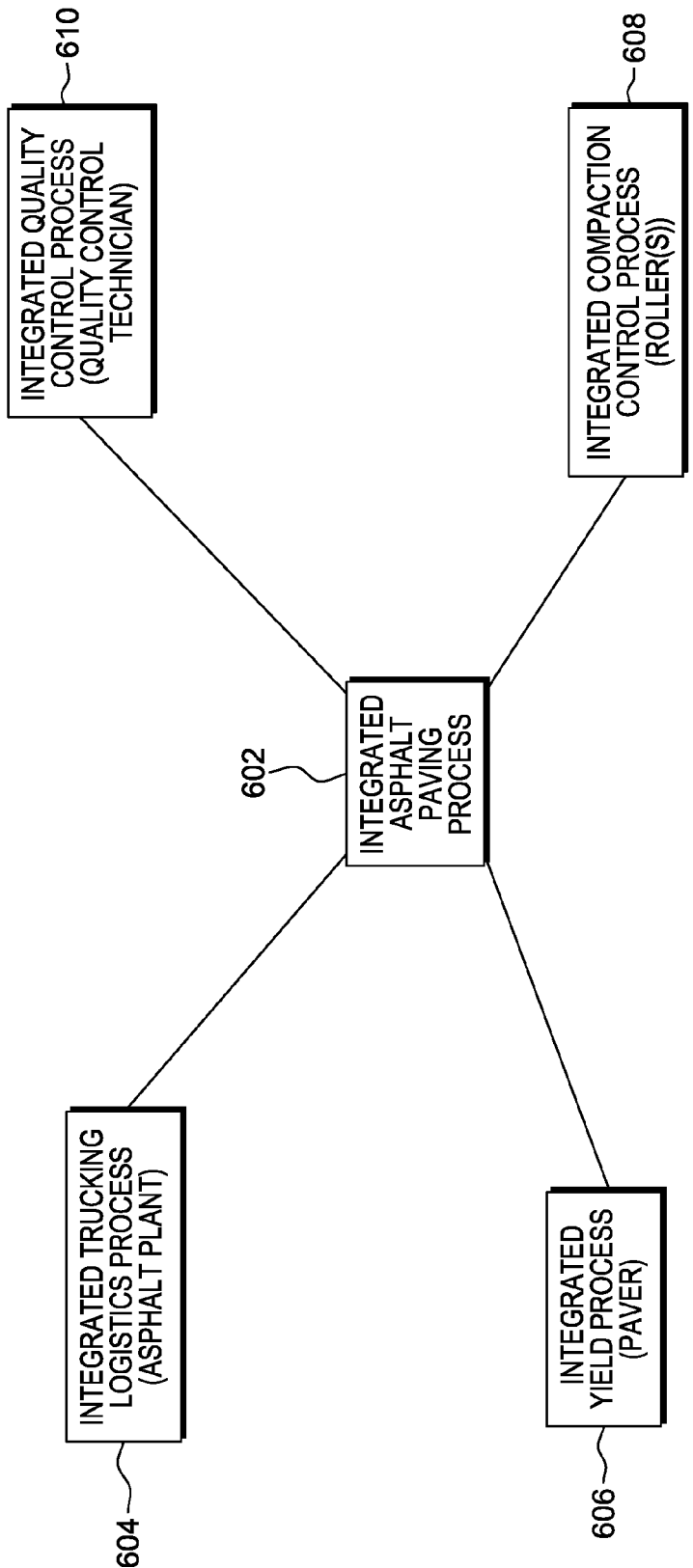
FIG. 6 depicts an overall schematic of an integrated asphalt paving process, in accordance with one or more aspects of the present invention.

FIG. 6 depicts an overall schematic of an integrated asphalt paving process, in accordance with one or more aspects of the present invention. The asphalt paving process 602 includes integration of four separate but related components:

Integrated Trucking Logistics Process 604: This process tracks progress and timeframe of asphalt delivery (indicated by weight tickets) and truck movement during the paving process
Integrated Yield Process 606: This process involves provision by a paver of information for continual or periodic yield calculation, including correlation of paved material quantities with delivered material quantities
Integrated Compaction Control Process 608: This process provides direction to the rollers in real time for compliance with a prescribed rolling pattern in order to deliver optimal compaction of the asphalt
Integrated Quality Control Process 610: This process leverages the results from the integrated trucking logistics, integrated yield, and integrated compaction control processes and provides a common sense system to automate quality control metrics, reports, and communication In one example, central server(s) 502 executes instructions to perform processes described below, for instance, based on the information received from one or more of the asphalt plant, paver, rollers, or QC technicians. The four components will now be described in further detail:

Integrated Trucking Logistics Process:

The present invention provides integrated positive control of the trucking function, that is, the delivery of asphalt to the job site from the asphalt production plant. The integrated trucking logistics process involves activity at the asphalt production plant and also incorporates timing aspects such as the timing of delivery of material to the paver, and timing of consumption of the delivered material at the paver. More specifically, the process accurately correlates the accumulating weight of the delivered mix passing through the paver to the individual weight tickets produced at the asphalt plant (accumulated weight of each load). This facilitates accurate identification and timing of the unloading and 'released empty' witness point (termination) of each load at the paver.

This termination completes a logic process that when integrated with the timing at the load out scale, accurately and in real time identifies the location of each truck at witness points in the delivery/return cycle. This information can then be processed to provide real time information to various entities, such as the foreman and/or the plant operator as to status of trucks in route to/from the paving site. Information such as the quantity of mix in transit and the estimated time of arrival of each truck, as well as other important management metrics, are tracked to facilitate precise control of paving speed, plant production rate, and material delivery operations.

Figure 7:
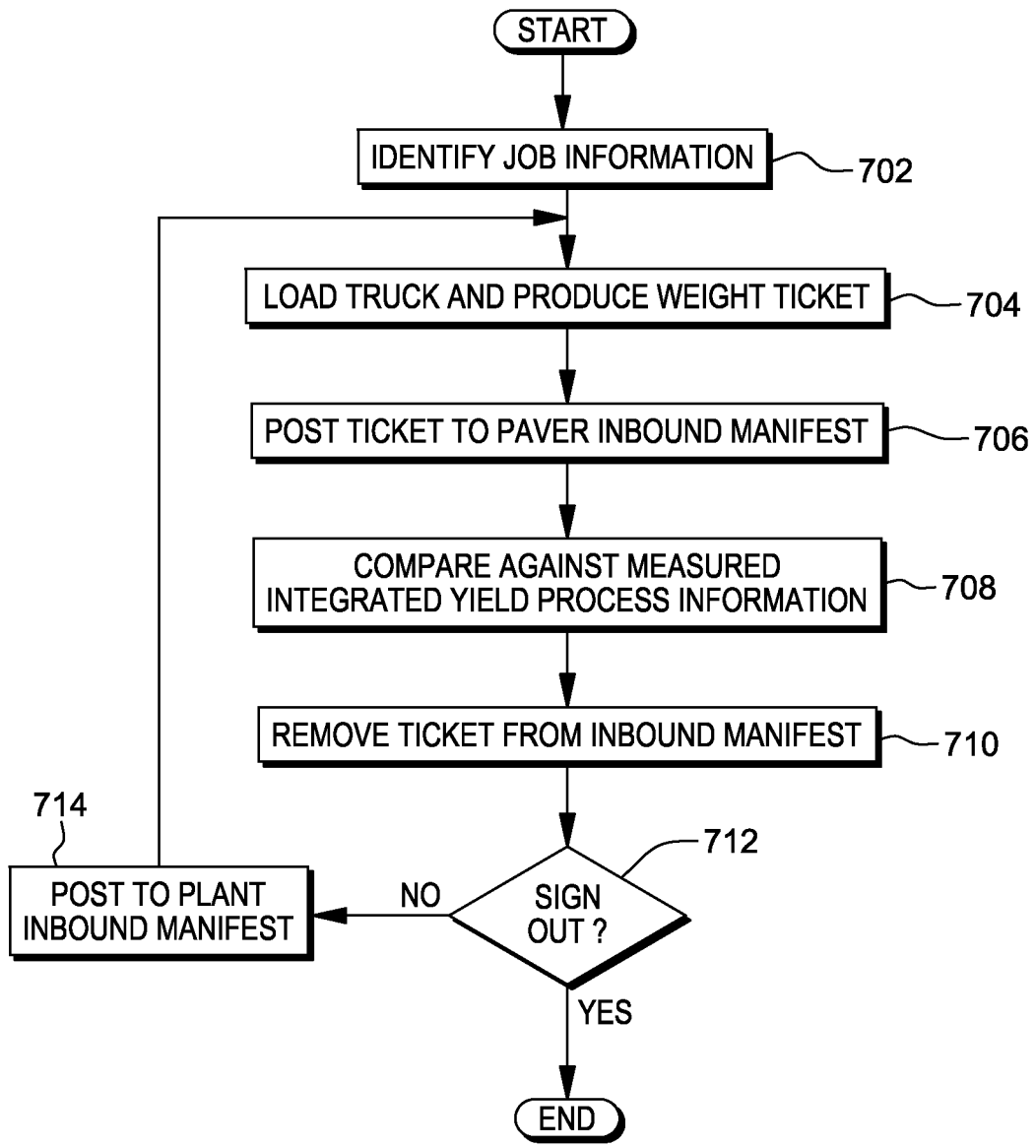
FIG. 7 depicts one example of an integrated trucking logistics process, in accordance with one or more aspects of the present invention.

Referring to FIG. 7, the process begins by identifying the job information (702). This includes job-related information such as job ID, provided at the scale. This information is, in one example, obtained/received by the central server (e.g. 502 of FIG. 5) to identify the activity with the specific job number and work process with which it is associated. Next, the truck is loaded and a weight ticket is produced indicating the weight of the asphalt that was loaded into the truck (704). At that point, the truck will typically travel to the paver and dump the load into the paver at the job site. The weight ticket is automatically posted by the central server to a paver inbound manifest (706). The inbound manifest provides inbound material information indicating quantity (weight) of paving material that is inbound to the paver to be laid during the paving operation, and may include one or multiple weight tickets, depending on the number of trucks transporting material to the job site.

During the paving process, the paver progresses along a route while receiving material from consecutive truck loads. The delivery trucks sequentially feed the material to the paver. As the paver consumes material during the paving process, the accumulated material quantity that is delivered to the screed and paved is measured and accounted-for using conveyor quantity allocation and the integrated yield process, both described below.

Because of the incremental nature in which asphalt is provided to, and distributed by, the paver, the paved material can be allocated to identified sources, i.e. the delivery trucks, in a first-in-first-out allocation scheme. Thus, if a first delivery truck dumps 88,000 lbs of asphalt into the paver, the first 88,000 lbs paved will be allocated to that truck. A next truck unloading 60,000 lbs of asphalt will see allocated to it the next 60,000 lbs of asphalt that is laid down. As noted above, a weight ticket indicates the accurate weight of material loaded on the truck. This indicated ("ticketed") weight should match the weight of material determined to have been provided by the truck in dumping its asphalt load into the paver.

Returning to FIG. 7, when the weight ticket has been posted to the paver inbound manifest and the load has been emptied into the paver, a comparison can be made (708) between the paver inbound manifest (indicating the weight of material contained by the truck when leaving the plant) and a measured accumulated material quantity (a value measured by the quantity calculation process described below) corresponding to the material that was contained by the truck. The quantity value provides an indication of the real time allocation of the accumulated material delivered to the screed. When the accumulated material quantity used value matches the paver inbound manifest value, the material delivered as part of that weight ticket is considered to have been consumed. Since there is a lag between when the material is deposited into the hopper of the paver and when it is paved by the screed, the indication that the material for a particular weight ticket has been used is actually delayed by an amount of time approximately equal to that lag. That is, if the material quantity used value indicates that all material from a particular load was consumed, in actuality, the truck that was assigned that load was 'released empty' a short time (i.e. the lag time) prior to that witness event (weight ticket-material used association).

A proximity signal provided by a proximity sensor (e.g. 162 of FIG. 1A) is correlated to the weight ticket and material used association. When the weight ticket—material used association indicates a truck's load has been consumed, the system correlates the time at which the proximity signal indicated that the truck left the sensor zone in front of the paver (the most recent 'truck left' proximity signal indication received prior to the time of the positive match between the weight ticket—material used association), and assigns the time of that particular proximity signal to the actual 'released unloaded' time for that truck. The system can thereby compensate for the delay between when the material is unloaded into the hopper (and the truck departs from the front of the paver) and when the material is actually paved by assigning the actual time of the truck 'released empty' witness point.

An asphalt delivery truck typically remains at the paver and travels along therewith (see FIG. 1B) until the truck's load is exhausted. Job circumstances sometimes require a truck to unload in partial dumps, pulling away and returning to the paver multiple times during the unloading of a single load. The process described above can accurately correlate the actual time of the 'released empty' witness point in this situation as well.

In an alternative to the example described above, an unloading machine, such as a material transfer vehicle (MTV), operates between the asphalt delivery tucks and the paver to improve the laydown process. When an unloading machine is used, a storage container (tub) is placed in the paver hopper to increase the quantity of material in the hopper positioned over the conveyors. In this configuration, the trucks, instead of dumping into the hopper, dump material directly into the unloading machine which transfers the material, for instance via an elevating conveyor, to the tub in the paver hopper. The process is similar to that described above except that the truck 'released' witness point at the paver is not available; because the truck interfaces with the unloading machine, and not the paver, the truck is not 'released' from the paver. The unloading machine can therefore be equipped with one or more motion sensors to detect proximity of the truck to the unloading machine, as well as its own set of components for conveyor quantity allocation measurement (i.e. movement of material through the unloading machine) including a computer system, and utilize these features to establish truck 'released' witness point timing of release from the unloading device. The paver will, like the situation described above, continue to provide the necessary data for yield-related measurements and weight-ticket correlation. The measurement and truck 'release' timing information obtained from the unloading machine can be communicated to the central server(s) and/or a computer system at the paver for integration with the information gathered at the paver to accurately monitor the chain of custody for the material once dumped into the unloading machine.

After the truck is emptied of material and the 'released empty' witness point is established, the weight ticket is removed by the central server from the paver inbound manifest (710). At that point, it is determined (712) whether the truck is to sign out. If so, the process ends. If the truck is instead to return to the plant for another load, the truck information is posted to a plant inbound manifest for the plant to indicate that the truck is inbound to the plant (714) where it returns for another load (704). In one example, the plant inbound manifest indicates an estimated time of arrival of the truck back to the plant (estimated by the central server based on, for instance, distance between the plant and paving site, traffic information, etc.) and is provided to the plant to facilitate material production control at the plant.

Advantageously, the process facilitates comparison of material received from a truck and actually consumed against the amount of material indicated on an inbound (to the paver) manifest. If a weight ticket of the paver inbound manifest indicates 88,000 pounds, a comparison of this amount against the quantity of material measured (using the integrated yield process) during the paving process at the paver will provide an indication of whether the full 88,000 pounds was received and utilized in the paving process.

Additionally, since all of this activity can be time-correlated by the system (e.g. central server 502), real-time traffic updates provided by, for instance commercially available internet-based services can be used to predict travel/arrival times for trucks between the plant and the paver. Such information may be useful when determining lead time, for instance, for production/provision of the material by the plant. As examples, traffic conditions might affect the arrival time of delivery trucks to the paver, thereby necessitating additional trucks to make the target delivery amount in the allotted timeframe for delivery (if travel time increases), or requiring increase in the production rate of the plant (if the travel time significantly decreases).

The integrated trucking logistics process utilizes conveyor quantity allocation (described below in connection with the integrated yield process). A time-referenced material placement map can be constructed as the asphalt is delivered to the screed. The position of the paver is detected and recorded relative to the accumulating, quantity of the paving material delivered to the screed. As described above, data acquired at the paver using, for instance, a remote terminal unit, and wirelessly (in one example) integrated with the truck load ticketing system at the asphalt plant provides real time logistical trucking information and performance solutions. 'Released empty' timing (truck empty) is determined as previously described and real time individual truck performance data can be displayed at the paver and the plant automatically and without operator intervention.

Trucking logistics and cost control is advantageously provided. Automatically generating an actual 'released empty' time value indicating when each load was completely discharged at the paver provides positive control to trucking logistics. The system can identify and quantify individual trip leg travel time efficiency compared to a preset target value. This in turn promotes efficiency in the process by automatically providing 'time docking' values for each load and accumulated for each truck. It can identify process inefficiencies such as incorrect number of trucks for paving rate, and/or out of balance shipping and job paving production rates. A job unique 'one way' travel time value enables complete and immediate performance data based on actual trucking activity for a truck shift.

In one example, a central server processes received paver and scale data and instantly provides/posts a real-time manifest at the paver and at the plant. Beneficial features include:

Paver Inbound Manifest: This in-bound (to the paver) load manifest can be posted on a paver control panel located at the paver and display the current status of each load that has been dispatched from the plant, including total weight of mix in route and the ETA of each load based on, for instance, estimated truck travel time and/or GPS location information from the trucks. The manifest is continually updated by a computer system (such as a remote terminal unit and/or central server) as trucks are unloaded, so an accurate total weight of mix in route and a the paver is always available at a glance.

Plant Inbound Manifest: This in-bound (to the plant) manifest can be posted on a control panel located at the plant to display the current status of trucks in route back to the plant to receive another asphalt load, as well as the ETA of each truck based on, for instance, estimated truck travel time and/or GPS location information from the trucks. The manifest is continually updated by the central servers as trucks are 'released empty' at the paver, so the plant always knows exactly how many trucks are in route (back to the plant) and when and how much material needs to be ready to load.

Automatic Alerts and Advisories: Custom configurable alerts and advisory graphics can be developed to keep specified users informed and in control of trucking costs at all times. The central server(s) can continuously or periodically identify exceptions to user defined parameters based on received information. Examples include ETA variances, sequence changes, and material quantity discrepancies between what was shipped on a load and what was paved. Practical real-time supervision of hauling operations and timely information is provided to facilitate managing details of the operation as they occur.

Historical Data Analysis: All of the exchanged data can be electronically recorded on, for instance memory, which can facilitate identification of best practices to develop critical process improvement training and improve business decision making with powerful and customizable data analysis and trending reporting capabilities.

Further advantages of the integrated trucking logistics process include: No requirement for the presence of any specific equipment on the individual trucks; control of truck cycle time and trucking logistics; live in-bound (to the paver) material manifest at the job site, complete with estimated times of arrival; live returning (to the plant) truck manifest at the plant complete with estimated times of arrival; reduced wait time at the plant and paver; enforcement of individual driver accountability at the load level, and for every load; and reduced trucking costs.

Integrated Yield Process:

The integrated yield process determination and delivery process is directed, at least in part, to accurately calculating material yield. This aspect provides a comprehensive solution to yield control and forecasting. Material yield data is accurately and instantly provided by measuring the incremental calibrated quantity of the mix provided over time to each of the left side of the screed and the right side of the screed, the incremental width over time of each, of the left side of the screed and the right side of the screed, and the incremental distance over time travelled by the screed. Increased yield control is provided by presenting yield data for the left and right sides of the screed as well as for the total screed. The effect of variable laying surface conditions are revealed and presented in real time, providing information critical to enhanced process control. Integrating this information with timing and location of the screed further provides valuable forensic data used to resolve variations in acceptance testing results and other quantitative and qualitative measurements. The accuracy and real time presentation of yield data is also critical to minimizing waste materials and end of day inefficiencies.

Figure 8:
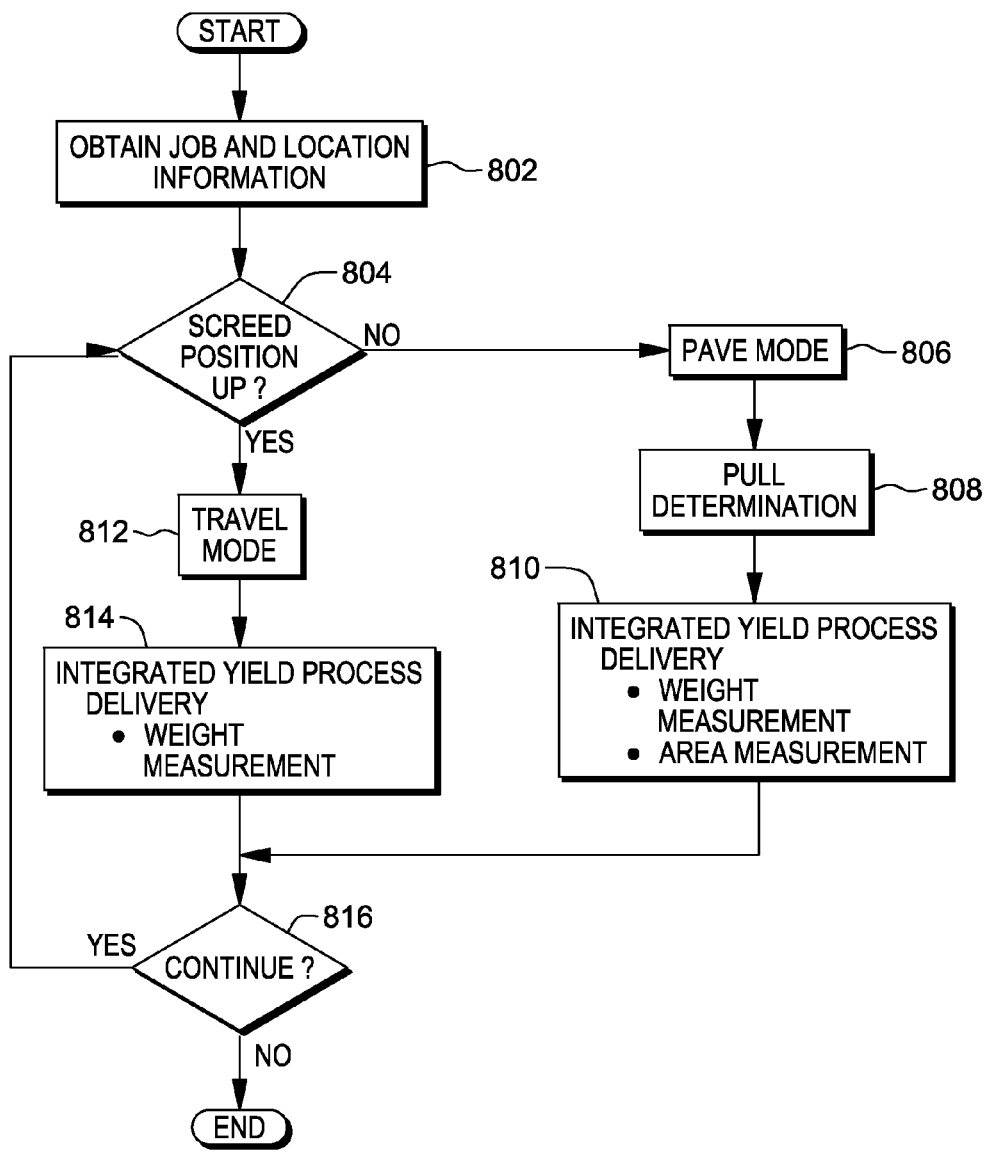
FIG. 8 depicts one example of an integrated yield process, in accordance with one or more aspects of the present invention.

An example of the integrated yield process is depicted in FIG. 8. At the start of a paving job, job identification and location information is obtained (802). Such information can include departure position (such as lane (lateral position, obtained via alpha-numeric keyed entry in one example), lift (obtained via alpha-numeric keyed entry in one example), direction, "station" the paver is starting at (obtained via alpha-numeric keyed entry in one example) and whether the station is increasing or decreasing (represented by a toggle, in one example), an indication of the current station (defined by the starting station plus or minus the measured distance, an end station (obtained via alpha-numeric keyed entry in one example), customer identification, project number, etc. In one example, prompt for at least some of this information is made to a paver operator for input by the operator using an input to a processing device at the paver.

Next, it is determined based on a screed position detection device or operator input, the position of the screed (804). In one example, the screed is either in paving position (i.e. down) or travel position (i.e. up). If the screed is not up, meaning it is down and in pave mode (806), then a pull determination (808) is made to identify the particular current 'pull'. As noted earlier, a 'pull' is a stretch of paving activity from a starting point of the paving position to the ending point of paving position. Pull is indicated by a pull number with, in one example, the pull numbering counting up from zero (a "zero" position is at the start of the shift and before the screed is lowered for the first pull of the shift) for each consecutive pull. There is a sequential order of production pulls, each having an accumulating volume of material deposited and the area covered by the pull starting when the screed is put down into the paving position and ending when the screed is lifted. Pull numbering is therefore defined by the screed going down (start of a pull) then going up (end of the pull), back down again (start of next pull), etc. At the end of a pull, the system proceeds to the next pull # and location information can default to the previously entered values but be made available for edit by keyed entry by a paver operator, in one example. The pull count may be periodically reset, for instance at the end of the day or end of a particular phase of the job.

After the pull is determined, yield component information such as material conveyance information including quantity and incremental advance data are provided by a computer system (such as a remote terminal unit) and delivered to the server continually during the pull (810), to facilitate instantaneous and average yield determinations (and recordation thereof) throughout the duration of the pull and at various locations along the pull route. In one example, the weight of material paved during the pull and the accumulating area paved during the pull are calculated at the paver using measurement data obtained from various sensors described above. For instance, the computer system can, throughout the duration of the pull, obtain incremental screed width data including measurements of the width of the right and left sides of the screed, as well as incremental paver location and distance travelled data indicating the distance traveled by the paver, and determine the area from those measurements. Additionally, the computer system can obtain paving material conveyance information data from the material height sensor(s) and the material conveyance system to determine the incremental quantity of the material delivered to the screed during the pull. The quantity of material can be measured in weight, wherein a determined effective count is converted to weight of material delivered, as described above. In another example, such measurement information is transmitted to a central server for calculation of the accumulating weight, area paved, and yield, and used to construct the time-reference material placement map described above.

Further details of the yield information is now provided. Yield is expressed as weight per unit area. The weight determination is made via a conveyor quantity allocation determination which leverages measurements at various points in time from various components located at the paver. These components include material height sensors in the conveyor tunnel, motion detection devices to determine relative absolute speed of the conveyors, sensors to count the uniform rotational advance of each conveyor drive system, sensors to detect the width of the paving screed, and a computer system such as a remote terminal unit at the paver to receive measurements from these sensors. Conveyor quantity allocation provides an 'adjusted' count of rotations for each conveyor, based on the product of the height and relative speed sensors. The adjusted count defines the quantity of material delivered by each conveyor to the screed. The quantity is representative of the weights on each load, therefore a calibration weight per rotation can be determined by dividing the specific known weight of a defined quantity of material by the adjusted count required to deliver that defined quantity to the screed. Using this calibration value, the actual weight of material delivered to the screed over time (and for various points in time during the period of time) is determined by the product of the adjusted count and the calibration weight factor.

To complete the yield calculation, the area covered by the screed during the same increment of time is obtained by determining the incremental measurement of distance travelled and the incremental width of the screed (and multiplying them, in one example). The distance travelled measurement is a direct measure of the forward distance travelled by paver when screed is in paving position for each pull. In one example, it is automatically reset to 0 each time the screed is lifted, indicating the end of the current pull. Screed width measurement is a measure and sum of the individual width of each side (left and right) of the screed, including the variable length extension thereof. Thus, the width of a side of the screed is composed of the sum of (i) half the width of the fixed screed, and (ii) the length of extension of that side's screed extension. By way of specific example, if the fixed screed is 12 feet wide, and the right side screed extension is extended 1.5 feet, the width measurement of the right ride side of the screed is (12/2)+1.5=7.5 feet. The material quantity measurement is determined by measuring the accumulating revolutions of the left and right conveyors conditioned by the level of material in the tunnels and relative conveyor speed factors, and applying a calibration factor to get the weight of material delivered to the screed, both for the left side and the right side.

The yield calculation is based on the area paved and the material weight used (material weight being determined from the measured incremental quantity of material based on conveyor movement and material height measurements) to pave the area (i.e. weight of material deposited over the area paved divided by the area paved). For any given time increment, the yield for the left side of the screed is calculated as the material weight delivered to the left side of the screed divided by the area paved by the left side of the screed, while yield for the right side of the screed is calculated as the material weight delivered to the right side of the screed divided by the area paved by the right side of the screed. Total yield is the sum of the left and right material weights divided by the sum of the left and right areas paved.

Returning to FIG. 8, if instead it is determined at 804 that the screed position is up, then this indicates that the paver is in a travel mode (812). In travel mode, weight measurement information is delivered to the central server, but area measurement information, in this example, is not. Weight information is important in travel mode because material can be delivered through the paver in this mode. This happens when, for instance, a small amount of asphalt is required for patching or other 'hand work' situations. By providing weight information during travel mode, an accurate chain of custody is maintained for the entire amount of the mix being consumed. The process continues by determining whether to continue (816), for instance for a next pull. If so, the process returns to 804, otherwise the process ends.

The integrated yield calculations facilitate increased efficiency and reduction of waste for a paving crew. This feature leverages the conveyor quantity allocation information and automatically integrates it with the real time area paved. Components to facilitate the integrated yield process, such as the appropriate measurement instrumentation, are easily installed at/on the paver to acquire data and automatically provide the accumulating area paved as well as accurate material quantity allocation information. Yield is determined for each side of the screed, as well as for the total screed, using the quantity and area measurements. Since a given weight of material correlates to a definite quantity thereof, weight of material paved can be determined, and yield can be calculated as the weight of material used divided by the area covered with that material.

The integrated yield process presents an instantaneous yield (i.e. at a given time corresponding to particular location of the paver at that time), average yield, and accumulated area paved for each pull the paver makes. All data can be recorded in time-value data pairs and communicated, e.g. wirelessly, to a central server. Features of the integrated yield process include:

Accumulated Area Paved: The actual accumulated area paved is automatically provided-to and displayed on a paver control panel for each paver pull.

Instant Yield: The yield for the most recent user defined increment parameter (for instance the most recent 10 tons of material, or the most recent 1 minute as measured by the conveyor quantity allocation) is automatically continuously provided-to and/or displayed at the paver, QC technician, and/or central server, providing control of variable conditions and instant feedback on the effect of screed adjustments. Data on material usage overrun, caused for instance by a variable paving surface or irregular curb exposure, is immediately recognizable and recordable. Since the material yield is presented for the left and right side of the screed as well as the total average, tolerance issues are exposed and valuable adjustments and corrections can be implemented, either manually or automatically.

Average Yield: Overall average for each pull is determined in real time. The paving manager is kept apprised of material requirements. Screed adjustments can be made to ensure compliance with contract requirements and to take advantage of allowable tolerances. Costly material waste can be eliminated by placing timely and accurate quantity orders (i.e. from the plant), to facilitate avoiding shortages, for instance at the end of the day.

Automatic Alerts and Advisories: A computer system at the paver or elsewhere can be configured to utilize the integrated yield process information to provide custom configurable alerts and advisory graphics to the paver, plant, or QC technician, as examples to facilitate control of material yield at all times. Practical real time supervision of paving yield performance is provided, as well as timely information which can facilitate management of variables as they occur.

Historical Data Analysis: All data can be recorded using storage media. The data can be examined/analyzed to determine best practices to develop critical spot on process improvement training and improve business decision making with data analysis and trending reporting capabilities provided by, e.g. the central server.

Advantages of the integrated yield process include: automatically determining and maintaining average yield and area paved; determining required material quantity with detailed control and precision; enhancing proactive yield control and material cost savings; instantly identifying changing field conditions; proactively managing and controlling the effect and cost of pre-existing conditions; establishing a precise time-referenced material placement map relative to departure and mat width; and increasing productivity.

Integrated Compaction Control Process:

Integrated positive control and direction of the compaction process of the roller(s) is provided. By accurately and automatically measuring the position and timing, of each roller on the paved mat, and correlating this with the timing of the placement of the mat by the paver subject to the timing and pattern parameters prescribed by the Quality Control technician, real time direction and supervision of performance is provided in the compaction process, and improved consistent quality results are achieved.

An asphalt roller is a self propelled steerable machine typically consisting of two axles operable in forward and reverse directions. The axles typically are a part of a large diameter rolling drum or a continuous series of pneumatic tires over the width of the machine. The roller(s) in a compaction effort are operated on the asphalt mat in a sequence established through control testing while the asphalt is in a specified temperature range. The path the rollers must traverse is defined by the fresh paved asphalt mat. Because of this, the integrated yield process described above can provide to the rollers a detailed time-referenced material placement map and roller guidance information indicating proper timing of each roller's required operation.

According to aspects of the present invention, the rollers in a compaction effort are provided with a positioning device to display an indication as to where the roller is to travel, and to measure and record the roller's real time positions, in time-value data pairs, on the hot mat. Additionally, rollers are provided with a pass mapping device to record the number of times the rollers pass over the same area. A thermal imaging device capable of identifying the hot/ambient temperature interface at the edge of the paved mat can provide indication of horizontal position on the mat by continuously computing and recording, in time-value data pairs, the horizontal distance from the sensor to the edge of the hot mat, which aids in determination of precise positioning of the rollers on the mat. Additionally, departure position of the roller is provided by a correlation of GPS departure point(s) registered by a GPS device on the roller correlated to GPS departure point(s) previously recorded by the paver and anchored to, for instance, the odometer departure of the paver. This information can be used to control position of the roller, for instance to ensure that the roller stays on the desired portion of the mat, and to document the orientation of the roller on the mat. The information is processed by a computer system on the paver, in one example. The computer on the paver can serve as a master remote terminal unit for slave remote terminal units on the rollers, whereby the slave remote terminal units are controlled by the master remote terminal unit to indicate proper position of the rollers.

Figure 9:
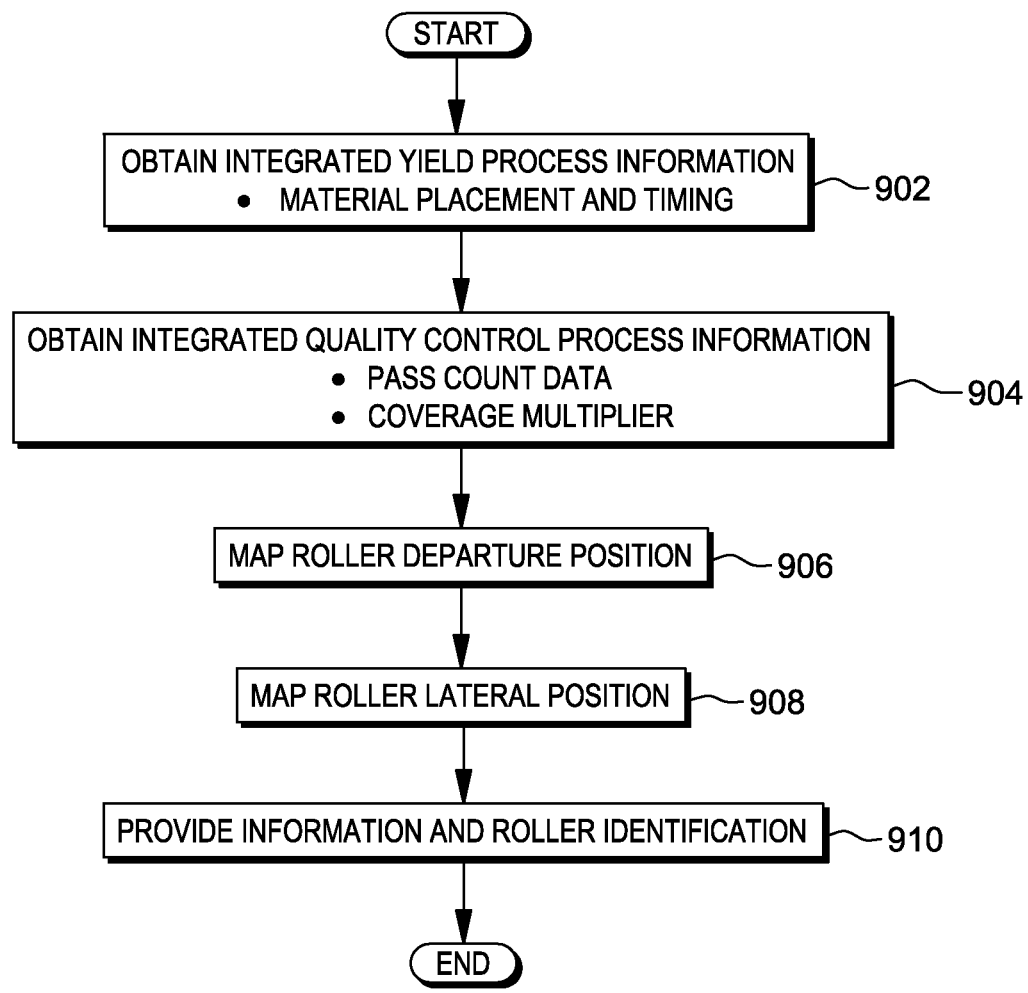
FIG. 9 depicts one example of an integrated compaction control process, in accordance with one or more aspects of the present invention.

Referring to FIG. 9, the integrated compaction control process commences by obtaining integrated yield information (such as material placement location, timing, and temperature) (902) as well as user entered/supplied integrated paving process quality control parameters (904) (described in further detail below—including, for instance, pass count data and coverage multiplier data). In one example, initial location and timed departure data from the integrated yield process is the same zero position as the paver. Screed width data is referenced from the automated yield information, to determine a correct position for the roller. As an example, if the material is 15 feet wide and the roller is 6 feet wide, this information is useful because it precisely indicates the presence and area of uncompacted material on each side of the roller. As the roller progresses, roller position is tracked in order to properly monitor and map roller departure position (906) and roller lateral position (908). This information, along with roller identification information such as equipment number (910), are provided to a master remote terminal unit or the central server, as an example.

Integrated compaction control process automation can facilitate improving the effectiveness and efficiency of the compaction process. This process leverages information from integrated trucking logistics and integrated yield processes and automatically provides precise direction to each roller operator in real time. A QC manager sets a target rolling pattern and other parameters (see integrated quality control process, below) which are provided to a computer system, such as the central server or master remote terminal unit at the paver, and used to direct a roller operator as to the proper rolling course in the form of roller guidance information. The current roller position as well as the proper roller positioning can be indicated at the roller, for instance on the time-referenced material placement map described above. A human machine interface (HMI) on-board the roller can display progress of the rolling process and alert the roller operator(s) to comply with the prescribed rolling pattern. This results in consistent compaction of the material, optimal cost effectiveness of the rollers, and maximum compaction incentive earnings. Components at the roller to facilitate the integrated compaction control process include a programmable logic controller (PLC) and HMI, which are easily installed on any roller and work for static and vibratory rollers. The integrated compaction control process acquires instant position data of the roller referenced to time, and transmits it to a master remote terminal unit at the paver and to the central server for integration with the time-referenced material placement map provided by the integrated yield and integrated trucking logistics processes. The integrated data can then be provided in real time as roller guidance information to the PLC and HMI on a roller where the actual progress of the roller is graphically presented on the time-referenced material placement map of the hot mat, to keep the operator on the proper course. Additionally, the same information is provided to the quality control manager to provide for positive supervision and control of the process in real time. For instance, a quality control manager can adjust one or more parameters of the compaction effort based on the information provided by the central server(s), which in turn modifies the guidance information provided to the roller operator.

The integrated compaction control process presents the actual timed position of the roller(s) relative to the mat map derived from the integrated yield and integrated trucking logistics processes instantly to the roller operator and QC manager. Some or all of the data is, in one example, timed and communicated wirelessly to a master remote terminal unit at the paver and/or to the central server. This advantageously provides:

Pass Count and Coverage Mapping: The integrated compaction control process establishes precise timed lateral position of each roller on the hot mat. Along with precise longitudinal (departure) positioning and continuous integration with the paved mat map, a real time visual display is presented to the roller operator as to timing, pass count and coverage compliance with the prescribed rolling pattern.

Process Coordination: The integrated compaction control process provides positive paving process control and coordination of paver speed and roller performance. Instant communication of process variables, such as an unintended stoppage of a roller, allows the paving manager to adjust a paving speed of the paver to maintain consistent quality and compaction results.

Instant Communication and Implementation of Changes to the Rolling Pattern: Changes can occur for all sorts of reasons, such as on-site variable conditions. The integrated compaction control process makes responding to changing weather conditions or other variables simple. The paving manager can issue updates to the rolling pattern and communicate them instantly to the rollers.

Automatic Alerts and Advisories: The integrated compaction control process provides custom configurable alerts and advisory graphics to maintain control of mat compaction at all times. Practical real time supervision of compaction compliance and performance is provided, as well as timely information to manage variables as they occur.

Historical Data Analysis: All data can be recorded using storage media. The data can be examined/analyzed to determine best practices to develop critical spot on process improvement training and improve business decision making with data analysis and trending reporting capabilities provided by, e.g. the central server.

Advantages of the integrated compaction control process include: establishing timing of each roller automatically based on the timing of the incremental placement of the material; maintaining coordination and communication between the paver and the rollers; enforcing individual operator accountability in real time; providing comprehensive process feedback and control to QC in real time; providing instant and proactive communication of rolling pattern modifications; instantly notifying of non conformance to enable immediate remediation; increasing roller efficiency and production, reducing costs and increasing profits; and establishing precise time-referenced material placement map of compaction performance for historical process review and improvement.

Integrated Quality Control Process:

The integrated quality control process provides positive quality control and quality control documentation. By accurately and automatically measuring key parameters and correlating them to time and position, real time information as to quality is presented to the foreman and is immediately actionable while the mix is in the proper temperature range for compaction. Also, by correlating relative field quality control data to plant and paver quality control data, and providing this in real time, manufacturing processes at the asphalt plant, transportation logistics to the job, and real-time paver control are refined to enhance quality results.

The integrated quality control process can direct the roller(s) as to the proper actions and the timing and location of those actions by way of the integrated compaction control process described above. In other words, changes to compaction effort parameters or other paving operation parameters made by the QC technician are processed by the integrated quality control process and delivered to the rollers via the integrated compaction control process. As described above, in the compaction control process, the rollers are continuously in contact with a master remote terminal unit at the paver and/or a central server, which provides compaction guidance information (such as proper location, direction and pass information) to the roller (e.g. a display thereof), and this compaction guidance information is developed based at least in part on information provided in accordance with the integrated quality control process.

Figure 10:
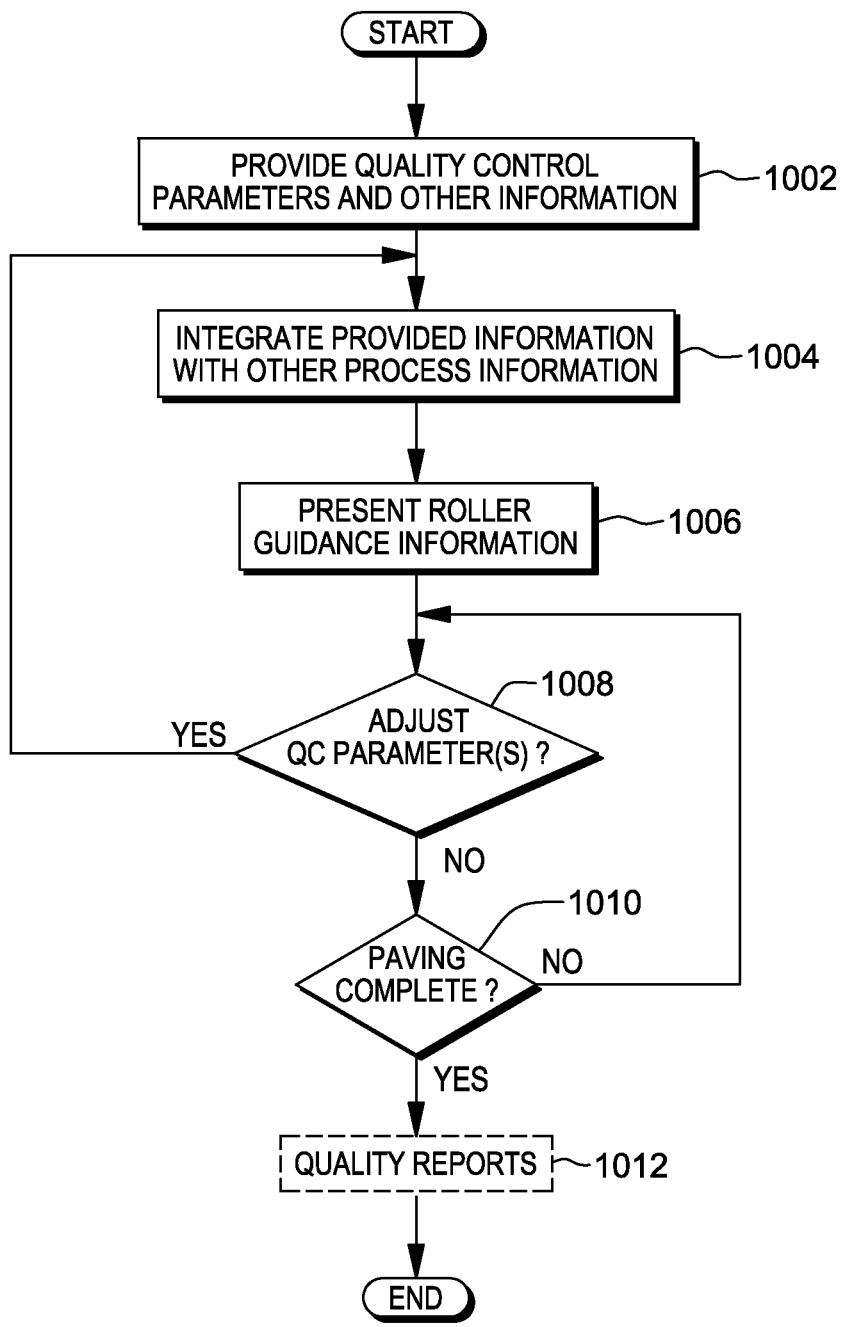
FIG. 10 depicts one example of an integrated quality control process, in accordance with one or more aspects of the present invention.

FIG. 10 depicts one example of an integrated quality control process, in accordance with one or more aspects of the present invention. In FIG. 10, paving operation quality control parameters and other information is provided (1002) by the QC technician to be used in quality control activities. In one example, this information is provided to the central server and a computer system, such as a remote terminal unit, at the paver. Quality control parameters and other information includes, as examples:

Required pass count, indicating a number of passes each roller is to make as part of the compaction process.

Coverage multiplier, indicating the multiplicative factor by which the paved mat is dimensionally wider than the roller. For example, a single coverage of the mat will typically require 2 passes over each portion thereof if the mat is 12 feet wide and the roller is more than 6 feet wide but less than 12 feet wide (thus giving a coverage multiplier of 2). This is different from the required pass count (above) which is the number of passes over each portion of the mat in order to attain the necessary level of compaction from the roller. By way of specific example, assume the required pass count is 3. Each linear portion of the 12' mat would require 2*3=6 properly positioned roller passes to accomplish the 3 passes for compaction on the entire area of the section.

Timing parameters to specify constraints that affect the timing of the compaction. An example timing parameter would a specification that the material must be rolled within ten minutes of being paved to ensure a proper quality result.

Additional information including job number, location (lane) of the mat and the work, and sequential pull number In one example, the QC technician initially sets a timing relationship between the paver and each roller based on the results of a previously constructed production test strip (typical standard industry requirement) conditioned by, for instance, asphalt production speed and ambient weather conditions (for example, air temperature and wind speed). In providing the quality control parameters, these data are communicated by the QC manager via a computer system such as a handheld device to be a paver remote terminal unit and/or the central server. The quality control parameters and other information are then integrated at the central server(s) with other process information (1004). For instance, this information is integrated with (i) the timed-referenced material placement map of paved mat (from the integrated yield process), (ii) the integrated trucking information to be used for determining whether plant production is to be affected, (iii) paver speed information to determine whether paver speed is to be affected. Roller guidance information determined based on the provided information is then communicated (1006) to each roller and optionally to the QC manager (i.e. quality control computer system thereof), for instance in the form of graphic coded maps presenting the actual paved mat, the location of the current working area of the mat for each roller, based on the timing parameters established above, and the real time actual position and desired position of the roller on the mat. In one example, the roller guidance information is communicated by way of a remote terminal unit of the paver to each of the rollers. The roller guidance information provides visual alerts to, e.g. an HMI display device to provide the roller operator alerts and indications regarding necessary roller location and speed adjustments, pass count(s) completed, and missed areas in the pattern. This roller guidance information may also provided to the QC manager, along with a comprehensive presentation of the information depicting the entire process in real time providing comprehensive monitoring and control of the integrated quality control process.

A determination can be made based on the integrated information as the paving process proceeds whether to adjust one or more paving operation quality control parameters (1008). In an example where the paver speed exceeds the ability of the rollers to make the necessary passes while remaining within the specified timing constraints, the QC manager determines this and effects an immediate modification to the paver speed. In another example, the QC manager determines that the ambient temperature has increased sufficiently during the shift that an increase in asphalt production is possible, and thereby effects an increase in production and paver speed, for instance by communicating desired changes to the paver operator and/or to the production plant. In any cases, when one or more paving operation quality control parameters are adjusted, the process repeats from 1004, wherein the updated values are integrated with other process information at the central server (1004). In one example the updated parameters cause relevant updated process control information to be provided to other entities that are affected by the QC adjustment(s). For instance, if an adjustment to a QC parameter indicated that asphalt production is to be increased at the plant, then the central server can, in on example, provide this information to the plant to adjust the plant activities and effect the production change. Returning to FIG. 10, updated roller guidance information is provided to the rollers and optionally the QC manager (1006). Thus, the performance prompts provided to the rollers are immediately adjusted to communicate these QC modifications and the process integrity is maintained. If instead at 1008 no adjustments to the QC parameters is made, it is determined whether paving is complete (1010). If not, the process returns to 1008 and repeats the determination whether adjustments are made to the quality control parameters. If paving is complete (1010), then one or more pre-specified quality reports are optionally instantly created (1012) using information gathered at the central server and/or computing systems at the plant, paver, roller(s), and/or QC manager, and the process ends.

The integrated quality control process provides a common sense system to automate quality control metrics and communication. Real time display to the roller operators, paving manager and quality control manager of progress mapping and quality metrics provides the opportunity for proactive process adjustments, coordination and control by operators and managers. Features of the integrated quality control process include:

Automatic Alerts and Advisories: Custom configurable alerts and advisory graphics to keep in control of consistency and specification compliance at all times. Practical real time supervision of quality compliance is provided, as well as timely information to manage variables as they occur.

Historical Data Analysis: All data can be recorded using storage media. The data can be examined/analyzed to determine best practices to develop critical spot on process improvement training and improve business decision making with data analysis and trending reporting capabilities provided by, e.g. the central server.

Advantages of the integrated quality control process include: Providing accuracy and repeatability of quality data measurements; making process adjustments immediately actionable based on live quality control data; maximizing earnings of performance incentives; minimizing costs of poor quality; easy and accurate forensic discovery by way of accurate of incremental material position; freeing-up Quality Control technician time to concentrate on managing process control; and increasing production while reducing the cost of quality control.

Aspects of the present invention facilitate provision of the following to, for instance, the paver:

Real time yield measurement to enable continuous fine tuning of screed adjustments to maximize material control and control of specification tolerances Real time accumulating area display to provide indication of changing or variable conditions in order to facilitate proactive adjustments Real time indications of left and right incremental yield. This information is advantageously leveraged to enable non-conforming pre-existing conditions to be proactively identified and resolved. The effect on cost and quality of variable or unplanned existing conditions are proactively discovered during the production process, instead of being revealed only through forensic discovery after the paving has been completed which makes resolution difficult, and expensive, and which causes unwanted compromise of results.

Truck 'in transit' manifest information to provide actionable data to set the proper paving forward speed to maintain continuous forward progress and facilitate elimination of unnecessary stops and trucks waiting to unload. The paver can be provided with an 'in transit' material manifest in shipping order detailing load ticket information, presenting an ETA for each load, and a 'total' tons in transit value. Additionally, the paver can be provided with and display the actual progress of the current truck being unloaded, which can facilitate prediction of ending location and more precise ordering of material quantities to reduce waste material and eliminate shortages.

Aspects of the present invention facilitate provision of the following to, for instance, the rollers:

Roller guidance information including real time visual and/or audio coded position mapping relative to path and pass count, to facilitate proper completion of the prescribed pattern by a roller operator Real time provision of time prompts (such as elapsed time) relative to the time-referenced material placement map in order to assure the rollers are properly maintaining pace with paving production rates Aspects of the present invention facilitate provision of the following to, for instance, the plant:

Plant 'returning empty' manifest information in order to provide actionable data to maximize efficiency at the plant. The manifest provides a real time display of the number of trucks, accumulated tare capacity, and ETA of each truck to the plant or to the paver, depending on whether the truck is carrying a load to the paving site, or returning from the paving site. Real time control of production of the hot mix is facilitated, to assure proper amounts of mix are in storage and ready to load, and thereby facilitating efficient loading and dispatch the trucks as they are received.

Aspects of the present invention advantageously facilitate provision of a paver which is operable to provide measurement and allocation of incremental quantity of paving material being applied while the paver proceeds over a surface. A conveyor quantity allocation determination measures and allocates the accumulating, over time and area covered, quantity (weight, mass, etc.) of paving material being delivered by the paver to the screed to provide an output for determining the instant yield, average yield, total accumulated volume delivered, and surface area covered. A computer system can receive as input data indicating the quantity measured and the surface area covered. Flow rate and/or yield information can be leveraged for process control such as to direct trucking logistics, the compaction effort, and the quality control process.

According to aspects of the present invention, the accumulating weight of the material delivered to the paver screed is related and can be correlated to the accumulating weight of the material dispatched to the job, as measured by the truck scale and indicated by weight tickets, and the exact time of the beginning and ending of the placement of each load is recorded. This provides for precise record of the logistics for each load, which can then be integrated with the asphalt plant dispatch time and haul route travel time to provide positive control of the material transportation function. The weight tickets can record pertinent information including date and time the material was deposited into the hauling unit (truck) and identification of the individual hauling unit. Aspects of the present invention can facilitate monitoring and refining the efficiency of the transportation process in real time both at the plant and the paver.

According to aspects of the present invention, precise screed control based on actual material yield is provided. Too high or too low a measured yield can prompt an adjustment to the screed in order to control the yield, for instance a target yield setting can be established either manually by the screed operator, or by interfacing with an automated screed control system on the paver. In addition, material flow rate information can influence adjustments such as the speed of mat placement and the metering of additives to the paving materials, as examples.

Figure 11:
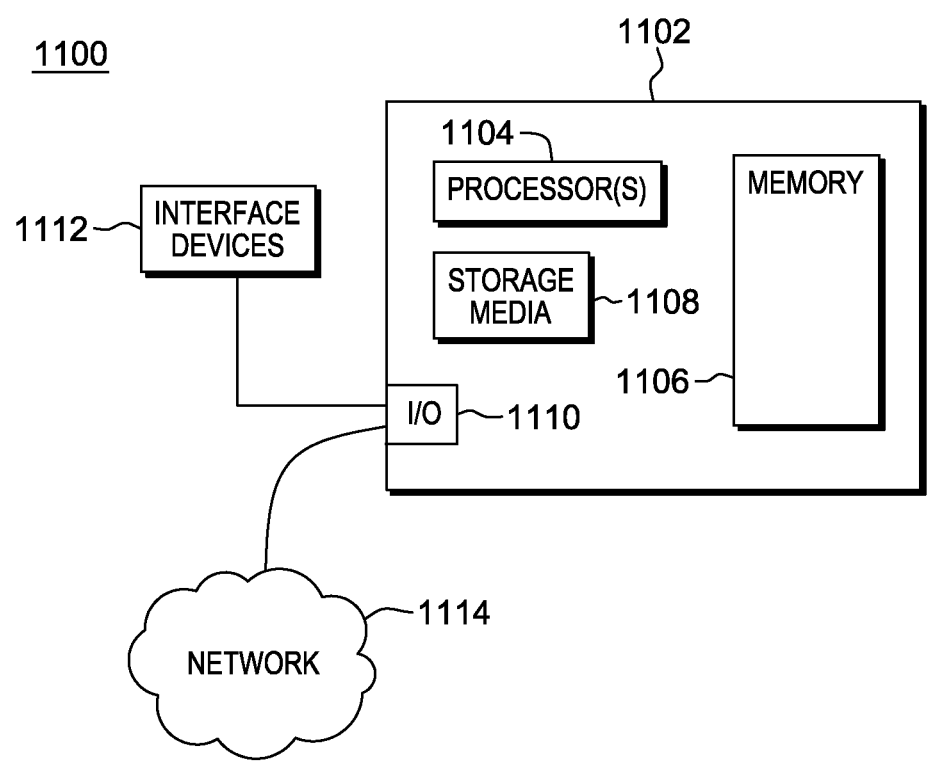
FIG. 11 depicts an example computer system to incorporate and/or user one or more aspects of the present invention.
Figure 12:
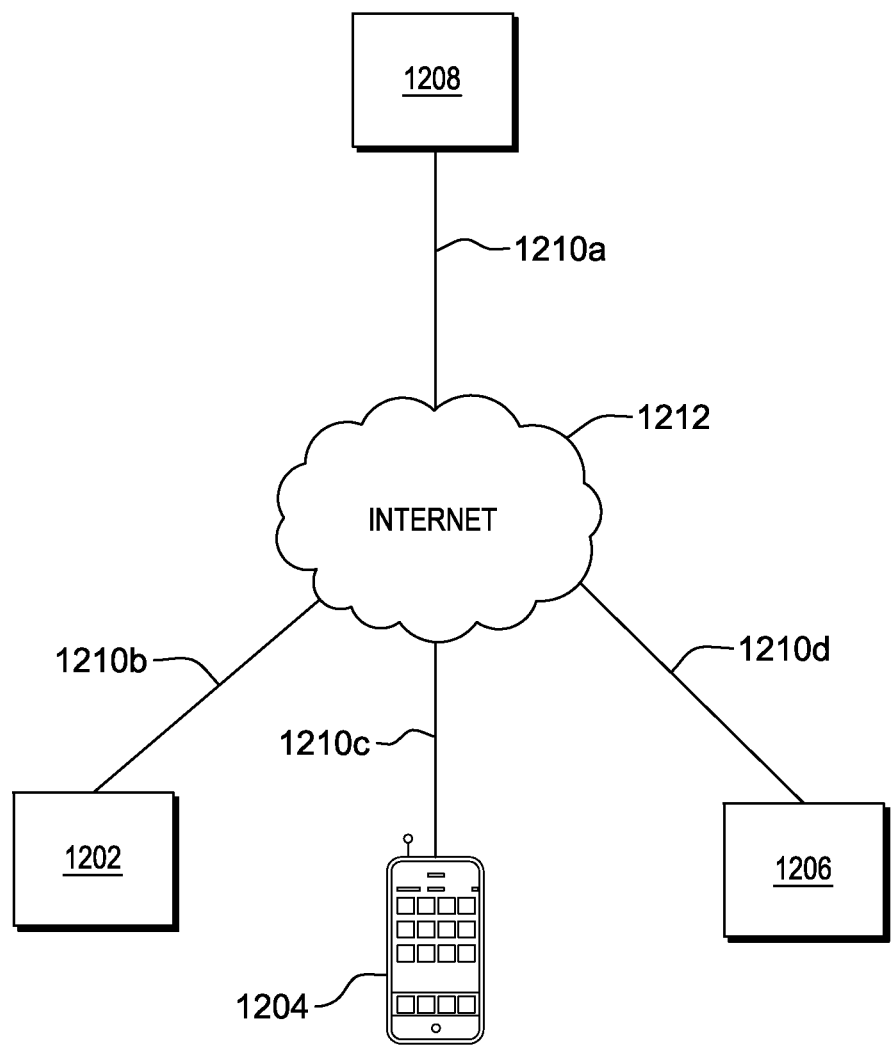
FIG. 12 depicts a computer environment to incorporate and/or user one or more aspects of the present invention.

FIG. 11 depicts an example computer system to incorporate and/or user one or more aspects of the present invention. In one example, the example computer system serves as one or more cent-al servers as described herein. In another example, the example computer system is located at the paver, asphalt plant, roller, or QC technician to facilitate aspects of the present invention related to the respective entity.

Referring to FIG. 11, computer system 1100 includes a base unit 1102, such as a personal computer, workstation, mobile device, RTU, or server. Base unit 1102 includes one or more processors 1104 and one or more memories 1106. Base unit 1102 further includes storage media 1108, such as one or more hard drive, magnetic media, CD, DVD and/or flash memories, for example. Base unit 1102 also includes one or more I/O adapters which connects base unit 1102 to one or more interface devices 1112 for input and/or output, such as a keyboard, a mouse, sensors, a touchscreen device, digitized entry device, display device, and/or any other interface devices. The various components of the base unit 1102 can be connected and in communication via one or more buses (not pictured) for enabling communication between the devices.

Base unit 1102 may communicate with other computer systems and/or networks of computer systems by way of a network adapter I/O device 1112 capable of communicating across one or more communications links with a network 1114. Base unit 1102 may be associated with such other computers in a Local Area Network (LAN) or a Wide Area Network (WAN), or may be a client in a client/server arrangement with another computer.

It will be appreciated that computer system 1110 could be incorporated into a single handheld or mobile device, such as a smartphone or tablet device housing the components of base unit 1102 and the interface devices 1112.

Figure 13:
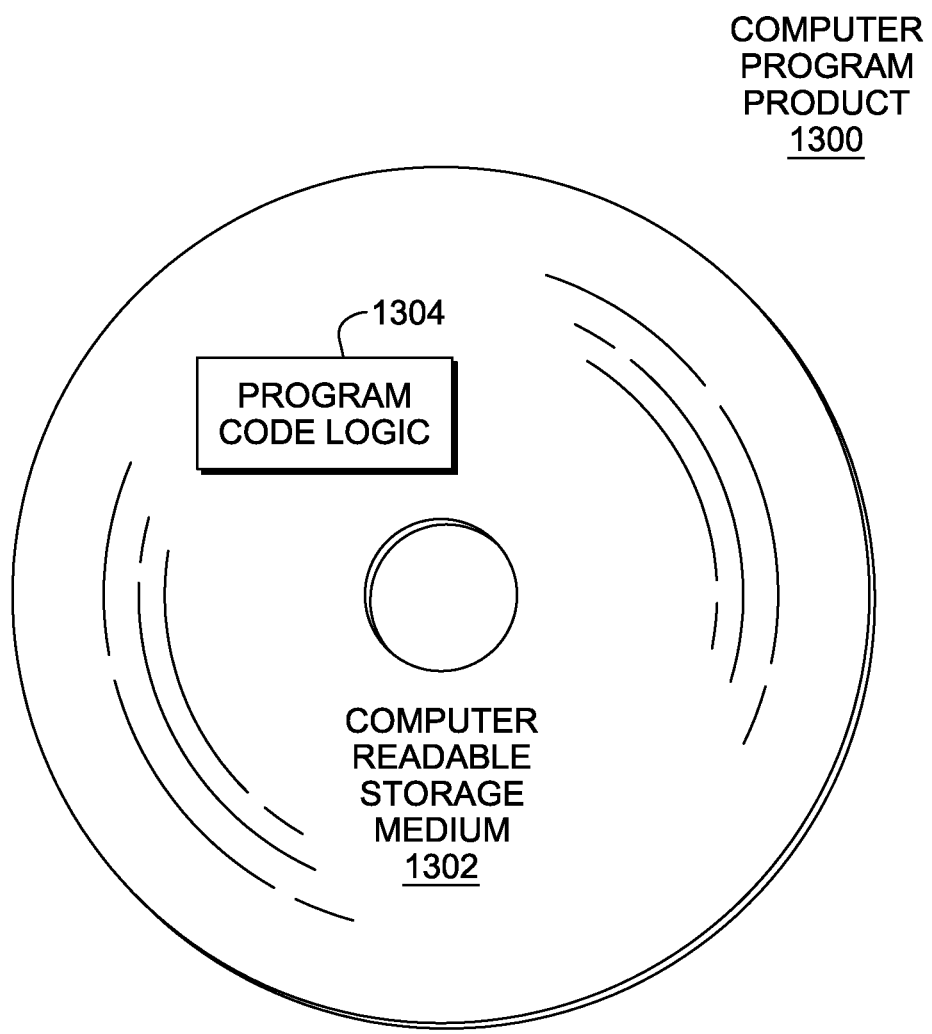
FIG. 13 depicts one embodiment of a computer program product to incorporate one or more aspects of the present invention.

FIG. 13 depicts a computing environment to incorporate and/or use one or more aspects of the present invention.

Computing environment 1200 includes a plurality of individual computer systems 1202, 1204, and 1206 in data communication with a remote server 1208 via one or more communications links 1210a-d and across one or more networks, such as the internet 1212. Those having ordinary skill in the art will recognize that communications links 1210a-b can comprises any suitable means of wired/wireless communication. In one example, remote server 1208 is a central server, computer systems 1202 and 1206 are located at an asphalt material production plant, paver, or roller, and computer system 1204 is a mobile device operated by a quality control technician to specify, display, and/or adjust one or more paving operation parameters.

As will be appreciated by one skilled in the art, aspects of the present invention may be embodied as a system, method or computer program product. Accordingly, aspects of the present invention may take the form of an entirely hardware embodiment, an entirely soft ware embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN, or the connection may be made to an external computer (for example, through the Internet using an Internet Service Provider).

Referring now to FIG. 13, in one example, a computer program product 1300 includes, for instance, one or more computer readable media 1302 to store computer readable program code means or logic 1304 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method for facilitating process control in a paving operation, the method comprising:
    obtaining paving material conveyance information for a time period during which paving material is delivered to a screed of a paver by a material conveyance system of the paver and distributed over a surface to be paved, the paving material conveyance information comprising material advance data indicating incremental advance of the paving material to the screed of the paver during the period of time, and the paving material conveyance information further comprising material quantity data indicating incremental quantity of the paving material at one or more points of the material conveyance system, wherein the material advance data and material quantity data are correlated to points in time during the time period at which the material advance data and material quantity data are acquired;
    determining, by the processor, based on the obtained paving material conveyance information, incremental quantity of paving material delivered to the screed for the points in time during the time period to facilitate process control in the paving operation, wherein the determined incremental quantity of paving material delivered to the screed comprises determined weight of the paving material delivered to the screed for the points in time during the time period;
    receiving inbound paving material information indicating a quantity of paving material to be received and laid as part of the paving operation, wherein the weight of paving material delivered to the screed corresponds to a weight of paving material indicated on a weight ticket of the inbound paving material information, the weight ticket corresponding to at least a portion of the quantity of paving material indicated by the received inbound paving material information; and
    responsive to determining that the determined weight of the paving material delivered to the screed matches the weight of material indicated on the weight ticket, indicating by the inbound paving material information that the weight of paving material indicated on the weight ticket was consumed, and correlating a truck released witness point in time to the weight ticket to indicate a point in time at which the weight of paving material indicated on the weight ticket was consumed.

2. The method of claim 1, further comprising automatically determining, based on the truck released witness point in time, an estimated time of arrival of the truck back to a paving material production plant, and providing the estimated time of arrival to the paving material production plant to facilitate control of paving material production at the paving material production plant.

3. A method for facilitating process control in a paving operation, the method comprising:
    obtaining paving material conveyance information for a time period during which paving material is delivered to a screed of a paver by a material conveyance system of the paver and distributed over a surface to be paved, the paving material conveyance information comprising material advance data indicating incremental advance of the paving material to the screed of the paver during the period of time, and the paving material conveyance information further comprising material quantity data indicating incremental quantity of the paving material at one or more points of the material conveyance system, wherein the material advance data and material quantity data are correlated to points in time during the time period at which the material advance data and material quantity data are acquired;
    determining, by the processor, based on the obtained paving material conveyance information, incremental quantity of paving material delivered to the screed for the points in time during the time period to facilitate process control in the paving operation;
    obtaining incremental screed width data indicating width of one or more portions of the screed for the points in time during the time period, and obtaining incremental distance data indicating distance traveled by the paver during the time period;
    determining based on the obtained incremental screed width data and incremental distance data an area of the surface paved during the time period; and
    determining, based on the determined incremental quantity of material delivered to the screed and the determined area of the surface paved, paving material yield at one or more spots of the surface.

4. The method of claim 3, wherein determining material yield at a spot of the surface comprises:
    determining a quantity of material deposited to the spot of the surface, and determining an area of the spot of the surface based on the obtained incremental screed width data and the incremental distance data; and dividing the determined quantity of material deposited to the spot of the surface by the area of the spot of the surface.

5. The method of claim 3, further comprising providing the determined material yield as material yield information to at least one of a quality control system or a paver control system to facilitate an adjustment to one or more paving operation parameters.

6. The method of claim 5, further comprising automatically adjusting the one or more paving operation parameters based on a target material yield for the paving operation.

7. A method for facilitating process control in a paving operation, the method comprising:
   obtaining paving material conveyance information for a time period during which paving material is delivered to a screed of a paver by a material conveyance system of the paver and distributed over a surface to be paved, the paving material conveyance information comprising material advance data indicating incremental advance of the paving material to the screed of the paver during the period of time, and the paving material conveyance information further comprising material quantity data indicating incremental quantity of the paving material at one or more points of the material conveyance system, wherein the material advance data and material quantity data are correlated to points in time during the time period at which the material advance data and material quantity data are acquired;
   determining, by the processor, based on the obtained paving material conveyance information, incremental quantity of paving material delivered to the screed for the points in time during the time period to facilitate process control in the paving operation;
   obtaining location information indicating location of the paver at the points in time during the time period;
   obtaining paved mat dimensional information, the paved mat dimensional information comprising linear distance traveled by the paver, width of one or more portions of the screed over the linear distance traveled by the paver, and incremental quantity of material for the points in time during the time period; and
   associating the paved mat dimensional information with the location information to obtain a time-referenced material placement map, the time-referenced material placement map comprising a departure dimension corresponding to the linear distance traveled by the paver, a screed width dimension corresponding to width of the one or more portions of the screed over the linear distance traveled by the paver, and a yield dimension indicating one or more quantities of material delivered to the screed and laid at various spots of the paved mat, and the time-referenced material placement map indicating timing of delivery of the one or more quantities of material to the various spots of the paved mat.

8. The method of claim 7, wherein the time period corresponds to a pull completed by the paver, the pull being defined by positioning of the screed, wherein lowering the screed defines a beginning of the pull and raising the screed defines an end of the pull, and wherein the method further comprises repeating the obtaining paving material conveyance information and the determining incremental quantity of paving material delivered to the screed for one or more additional pulls of the paver during the paving operation.

9. The method of claim 7, further comprising:
   determining, based on the time-referenced material placement map and further based on one or more parameters of a compaction effort for compacting the paving material after placement on the surface, roller guidance information to facilitate controlling operation of a roller, wherein the roller guidance information indicates current roller position of the roller and proper roller positioning of the roller on the time-referenced material placement map; and
   providing the roller guidance information to the roller to facilitate proper compaction of the paving material.

10. The method of claim 9, further comprising providing the roller guidance information to a quality control system for controlling the one or more parameters of the compaction effort.

11. The method of claim 9, further comprising obtaining temperature information from the paver, the temperature information indicating incremental temperature of the paving material being delivered to the screed, and wherein the roller guidance information is further determined based on the obtained temperature information.

12. A computer system for facilitating process control in a paving operation, the computer system comprising:
   a memory; and
   a processor in communications with the memory, wherein the computer system is configured to perform:
      obtaining paving material conveyance information for a time period during which paving material is delivered to a screed of a paver by a material conveyance system of the paver and distributed over a surface to be paved, the paving material conveyance information comprising material advance data indicating incremental advance of the paving material to the screed of the paver during the period of time, and the paving material conveyance information further comprising material quantity data indicating incremental quantity of the paving material at one or more points of the material conveyance system, wherein the material advance data and material quantity data are correlated to points in time during the time period at which the material advance data and material quantity data are acquired;
      determining, based on the obtained paving material conveyance information, incremental quantity of paving material delivered to the screed for the points in time during the time period to facilitate process control in the paving operation, wherein the determined incremental quantity of paving material delivered to the screed comprises determined weight of the paving material delivered to the screed for the points in time during the time period;
      receiving inbound paving material information indicating a quantity of paving material to be received and laid as part of the paving operation, wherein the weight of paving material delivered to the screed corresponds to a weight of paving material indicated on a weight ticket of the inbound paving material information, the weight ticket corresponding to at least a portion of the quantity of paving material indicated by the received inbound paving material information; and
      responsive to determining that the determined weight of the paving material delivered to the screed matches the weight of material indicated on the weight ticket, indicating by the inbound paving material information that the weight of paving material indicated on the weight ticket was consumed, and correlating a truck released witness point in time to the weight ticket to indicate a point in time at which the weight of paving material indicated on the weight ticket was consumed.

13. The computer system of claim 12, wherein the computer system is further configured to perform:
automatically determining, based on the truck released witness point in time, an estimated time of arrival of the truck back to a paving material production plant, and providing the estimated time of arrival to the paving material production plant to facilitate control of paving material production at the paving material production plant.

14. A computer system for facilitating process control in a paving operation, the computer system comprising:
a memory; and
a processor in communications with the memory, wherein the computer system is configured to perform:
obtaining paving material conveyance information for a time period during which paving material is delivered to a screed of a paver by a material conveyance system of the paver and distributed over a surface to be paved, the paving material conveyance information comprising material advance data indicating incremental advance of the paving material to the screed of the paver during the period of time, and the paving material conveyance information further comprising material quantity data indicating incremental quantity of the paving material at one or more points of the material conveyance system, wherein the material advance data and material quantity data are correlated to points in time during the time period at which the material advance data and material quantity data are acquired;
determining, based on the obtained paving material conveyance information, incremental quantity of paving material delivered to the screed for the points in time during the time period to facilitate process control in the paving operation;
obtaining incremental screed width data indicating width of one or more portions of the screed for the points in time during the time period, and obtaining incremental distance data indicating distance traveled by the paver during the time period;
determining based on the obtained incremental screed width data and incremental distance data an area of the surface paved during the time period; and
determining, based on the determined incremental quantity of material delivered to the screed and the determined area of the surface paved, paving material yield at one or more spots of the surface.

15. The computer system of claim 14, wherein the computer system is further configured to perform providing the determined material yield as material yield information to at least one of a quality control system or a paver control system to facilitate an adjustment to one or more paving operation parameters.

16. A computer system for facilitating process control in a paving operation, the computer system comprising:
a memory; and
a processor in communications with the memory, wherein the computer system is configured to perform:
obtaining paving material conveyance information for a time period during which paving material is delivered to a screed of a paver by a material conveyance system of the paver and distributed over a surface to be paved, the paving material conveyance information comprising material advance data indicating incremental advance of the paving material to the screed of the paver during the period of time, and the paving material conveyance information further comprising material quantity data indicating incremental quantity of the paving material at one or more points of the material conveyance system, wherein the material advance data and material quantity data are correlated to points in time during the time period at which the material advance data and material quantity data are acquired;
determining, based on the obtained paving material conveyance information, incremental quantity of paving material delivered to the screed for the points in time during the time period to facilitate process control in the paving operation;
obtaining location information indicating location of the paver at the points in time during the time period;
obtaining paved mat dimensional information, the paved mat dimensional information comprising linear distance traveled by the paver, width of one or more portions of the screed over the linear distance traveled by the paver, and incremental quantity of material for the points in time during the time period; and
associating the paved mat dimensional information with the location information to obtain a time-referenced material placement map, the time-referenced material placement map comprising a departure dimension corresponding to the linear distance traveled by the paver, a screed width dimension corresponding to width of the one or more portions of the screed over the linear distance traveled by the paver, and a yield dimension indicating one or more quantities of material delivered to the screed and laid at various spots of the paved mat, and the time-referenced material placement map indicating timing of delivery of the one or more quantities of material to the various spots of the paved mat.

17. The computer system of claim 16, wherein the computer system is further configured to perform:
determining, based on the time-referenced material placement map and further based on one or more parameters of a compaction effort for compacting the paving material after placement on the surface, roller guidance information to facilitate controlling operation of a roller, wherein the roller guidance information indicates current roller position of the roller and proper roller positioning of the roller on the time-referenced material placement map; and
providing the roller guidance information to the roller to facilitate proper compaction of the paving material.

18. A computer program product for facilitating process control in a paving operation, the computer program product comprising:
a non-transitory storage medium readable by a processor and storing instructions for execution by the processor to perform a method comprising:
obtaining paving material conveyance information for a time period during which paving material is delivered to a screed of a paver by a material conveyance system of the paver and distributed over a surface to be paved, the paving material conveyance information comprising material advance data indicating incremental advance of the paving material to the screed of the paver during the period of time, and the paving material conveyance information further comprising material quantity data indicating incremental quantity of the paving material at one or more points of the material conveyance system, wherein the material advance data and material quantity data are correlated to points in time during the time period at which the material advance data and material quantity data are acquired;

determining, by the processor, based on the obtained paving material conveyance information, incremental quantity of paving material delivered to the screed for the points in time during the time period to facilitate process control in the paving operation, wherein the determined incremental quantity of paving material delivered to the screed comprises determined weight of the paving material delivered to the screed for the points in time during the time period;

receiving inbound paving material information indicating a quantity of paving material to be received and laid as part of the paving operation, wherein the weight of paving material delivered to the screed corresponds to a weight of paving material indicated on a weight ticket of the inbound paving material information, the weight ticket corresponding to at least a portion of the quantity of paving material indicated by the received inbound paving material information; and responsive to determining that the determined weight of the paving material delivered to the screed matches the weight of material indicated on the weight ticket, indicating by the inbound paving material information that the weight of paving material indicated on the weight ticket was consumed, and correlating a truck released witness point in time to the weight ticket to indicate a point in time at which the weight of paving material indicated on the weight ticket was consumed.

19. A computer program product for facilitating process control in a paving operation, the computer program product comprising:

a non-transitory storage medium readable by a processor and storing instructions for execution by the processor to perform a method comprising:

obtaining paving material conveyance information for a time period during which paving material is delivered to a screed of a paver by a material conveyance system of the paver and distributed over a surface to be paved, the paving material conveyance information comprising material advance data indicating incremental advance of the paving material to the screed of the paver during the period of time, and the paving material conveyance information further comprising material quantity data indicating incremental quantity of the paving material at one or more points of the material conveyance system, wherein the material advance data and material quantity data are correlated to points in time during the time period at which the material advance data and material quantity data are acquired;

determining, by the processor, based on the obtained paving material conveyance information, incremental quantity of paving material delivered to the screed for the points in time during the time period to facilitate process control in the paving operation;

obtaining incremental screed width data indicating width of one or more portions of the screed for the points in time during the time period, and obtaining incremental distance data indicating distance traveled by the paver during the time period;

determining based on the obtained incremental screed width data and incremental distance data an area of the surface paved during the time period; and determining, based on the determined incremental quantity of material delivered to the screed and the determined area of the surface paved, paving material yield at one or more spots of the surface.

20. The computer program product of claim 19, wherein the method further comprises providing the determined material yield as material yield information to at least one of a quality control system or a paver control system to facilitate an adjustment to one or more paving operation parameters.

21. A computer program product for facilitating process control in a paving operation, the computer program product comprising:

a non-transitory storage medium readable by a processor and storing instructions for execution by the processor to perform a method comprising:

obtaining paving material conveyance information for a time period during which paving material is delivered to a screed of a paver by a material conveyance system of the paver and distributed over a surface to be paved, the paving material conveyance information comprising material advance data indicating incremental advance of the paving material to the screed of the paver during the period of time, and the paving material conveyance information further comprising material quantity data indicating incremental quantity of the paving material at one or more points of the material conveyance system, wherein the material advance data and material quantity data are correlated to points in time during the time period at which the material advance data and material quantity data are acquired;

determining, by the processor, based on the obtained paving material conveyance information, incremental quantity of paving material delivered to the screed for the points in time during the time period to facilitate process control in the paving operation;

obtaining location information indicating location of the paver at the points in time during the time period;

obtaining paved mat dimensional information, the paved mat dimensional information comprising linear distance traveled by the paver, width of one or more portions of the screed over the linear distance traveled by the paver, and incremental quantity of material for the points in time during the time period; and associating the paved mat dimensional information with the location information to obtain a time-referenced material placement map, the time-referenced material placement map comprising a departure dimension corresponding to the linear distance traveled by the paver, a screed width dimension corresponding to width of the one or more portions of the screed over the linear distance traveled by the paver, and a yield dimension indicating one or more quantities of material delivered to the screed and laid at various spots of the paved mat, and the time-referenced material placement map indicating timing of delivery of the one or more quantities of material to the various spots of the paved mat.

22. The computer program product of claim 21, wherein the method further comprises:

determining, based on the time-referenced material placement map and further based on one or more parameters of a compaction effort for compacting the paving material after placement on the surface, roller guidance information to facilitate controlling operation of a roller, wherein the roller guidance information indicates current roller position of the roller and proper roller positioning of the roller on the time-referenced material placement map; and providing the roller guidance information to the roller to facilitate proper compaction of the paving material.

* * * * *